US012621766B2

(12) United States Patent (10) Patent No.: US 12,621,766 B2
Kim et al. (45) Date of Patent: May 5, 2026

(54) MULTI-ACCESS POINT TARGET WAKE TIME INFORMATION REQUEST

(71) Applicant: Ofinno, LLC, Reston, VA (US)

(72) Inventors: Jeongki Kim, Fairfax, VA (US); Leonardo Alisasis Lanante, Reston, VA (US); Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/390,743

(22) Filed: Nov. 17, 2025

(65) Prior Publication Data

US 2026/0075521 A1     Mar. 12, 2026

Related U.S. Application Data

(63) Continuation of application No. PCT/US2024/030319, filed on May 21, 2024.

(60) Provisional application No. 63/468,829, filed on May 25, 2023.

(51) Int. Cl.
*G08C 17/00* (2006.01)
*H04W 52/02* (2009.01)
*H04W 74/00* (2009.01)

(52) U.S. Cl.
CPC ..... *H04W 52/0216* (2013.01); *H04W 74/006* (2013.01)

(58) Field of Classification Search
CPC ......... H04W 52/0235; H04W 52/0206; H04W 52/0216; H04W 52/0229; H04W 74/006; Y02D 30/70

USPC .......................................................... 370/311
See application file for complete search history.

(56) References Cited

U.S. PATENT DOCUMENTS

| | | | | |
|---|---|---|---|---|
| 2015/0189592 A1* | 7/2015 | Jafarian | ............ | H04W 52/0216 |
| | | | | 370/311 |
| 2021/0360646 A1* | 11/2021 | Chu | .................... | H04W 72/569 |
| 2022/0303893 A1* | 9/2022 | Chu | ...................... | H04W 76/40 |
| 2022/0408355 A1* | 12/2022 | Shafin | .................. | H04B 17/336 |
| 2023/0140312 A1 | 5/2023 | Ajami et al. | | |
| 2023/0216633 A1 | 7/2023 | Laurent et al. | | |
| 2023/0422234 A1 | 12/2023 | Baek et al. | | |

FOREIGN PATENT DOCUMENTS

| | | |
|---|---|---|
| WO | 2022108404 A1 | 5/2022 |
| WO | 2022132030 A1 | 6/2022 |

OTHER PUBLICATIONS

IEEE 802.11-23/226r2; Jul. 2023; Considerations for AP coordination in UHR: Coordinated Medium Access; Date: Jan. 30, 2023; Abdel Karim Ajami et al.

(Continued)

*Primary Examiner* — Temica M Beamer

(74) *Attorney, Agent, or Firm* — Yasser Mourtada; Kavon Nasabzadeh; James Bender

(57) ABSTRACT

A first access point (AP) transmits to a second AP a first frame requesting first restricted target wake time (R-TWT) information of the second AP based on not receiving a beacon frame of the second AP within a first period from a target beacon transmission time (TBTT) of the second AP. The first AP receives from the second AP a second frame comprising the first R-TWT information of the second AP in response to the first frame.

20 Claims, 23 Drawing Sheets

<u>1900</u>

(56)  References Cited

OTHER PUBLICATIONS

IEEE P802.1 1be/D1.01, Jun. 2021; 9. Frame formats; 9.2 MAC frame formats; 9.2.4 Frame fields; 9.2.4.1 Frame Control field; 9.2.4.1.8 More Data subfield; IEEE Draft; TGBE_CL_09; IEEE—SA; Piscataway, NJ USA; vol. 802. Ilbe drafts; No. DI.01; Jun. 30, 2021.
International Search Report and Written Opinion of the International Searching Authority mailed Oct. 24, 2024, in International Application No. PCT/US2024/030319.

* cited by examiner

1100

1800

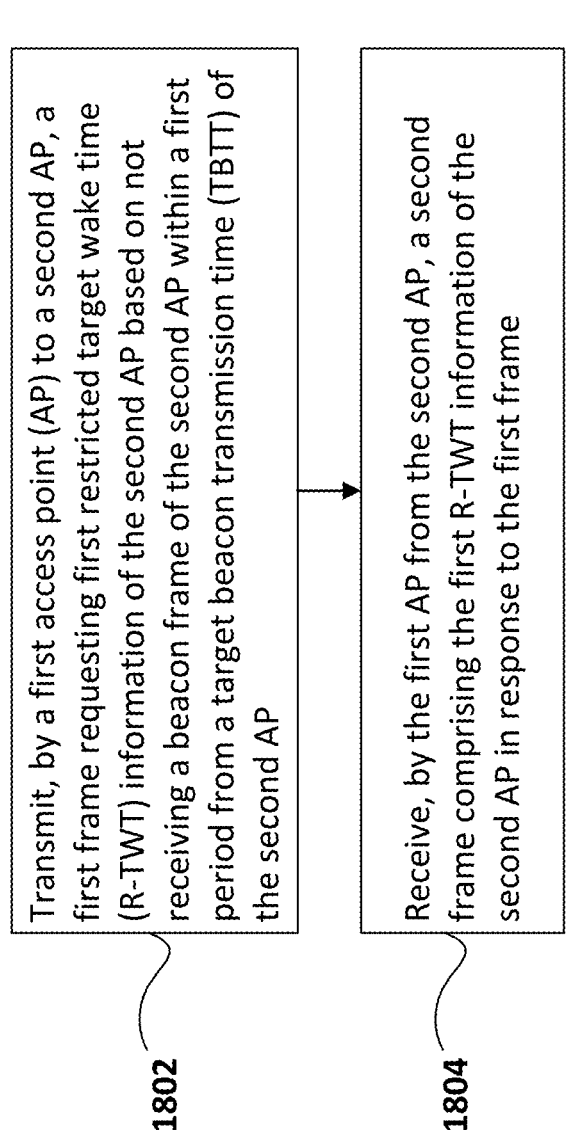

Transmit, by a first access point (AP) to a second AP, a first frame requesting first restricted target wake time (R-TWT) information of the second AP based on not receiving a beacon frame of the second AP within a first period from a target beacon transmission time (TBTT) of the second AP

1802

Receive, by the first AP from the second AP, a second frame comprising the first R-TWT information of the second AP in response to the first frame

1902 Receive, by a first access point (AP) from a second AP, a first frame requesting first restricted target wake time (R-TWT) information of the first AP 1904 Transmit, by the first AP to the second AP, a second frame comprising the first R-TWT information of the first AP in response to the first frame

2000

Receive, by a first access point (AP) from a second AP, a first frame comprising a restricted target wake time (R-TWT) change count

2002

Based on the R-TWT change count being equal to a stored R-TWT change count, stop a backoff procedure to transmit to the second AP a second frame requesting R-TWT information of the second AP

2004

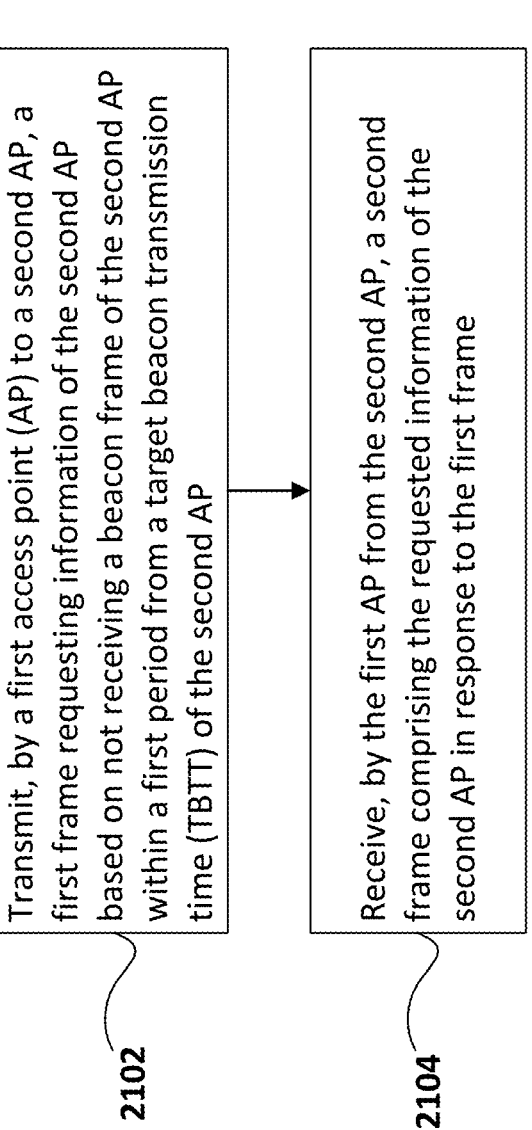

2100

2102 Transmit, by a first access point (AP) to a second AP, a first frame requesting information of the second AP based on not receiving a beacon frame of the second AP within a first period from a target beacon transmission time (TBTT) of the second AP 2104 Receive, by the first AP from the second AP, a second frame comprising the requested information of the second AP in response to the first frame

FIG. 21

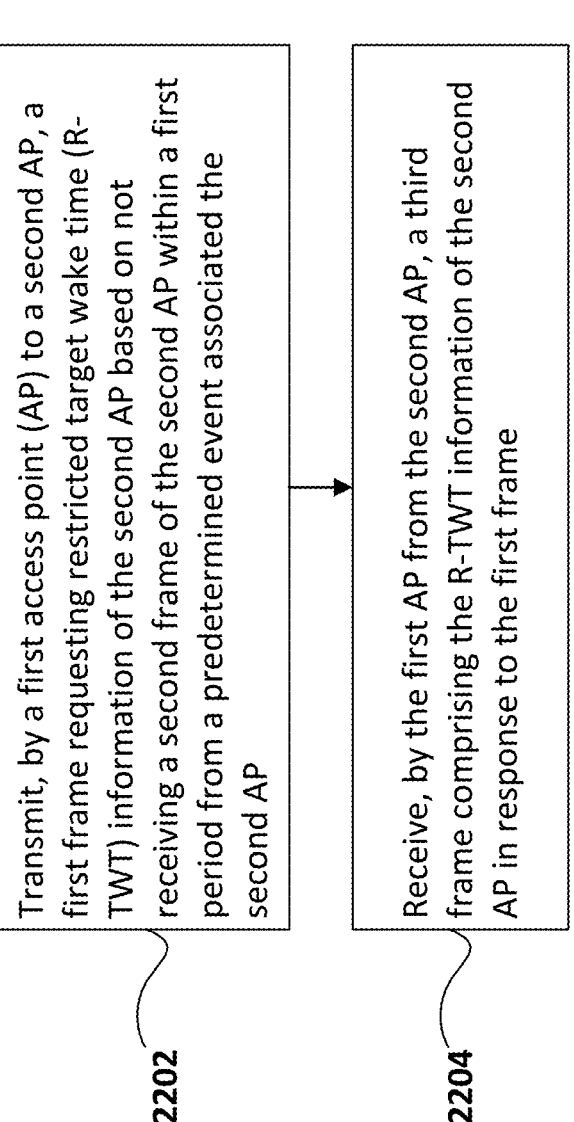

2200

Transmit, by a first access point (AP) to a second AP, a first frame requesting restricted target wake time (R-TWT) information of the second AP based on not receiving a second frame of the second AP within a first period from a predetermined event associated the second AP

2202

Receive, by the first AP from the second AP, a third frame comprising the R-TWT information of the second AP in response to the first frame

Transmit, by a first access point (AP) to a second AP, a first frame requesting restricted target wake time (R-TWT) information of the second AP based on a condition being satisfied

2302

Receive, by the first AP from the second AP, a second frame comprising the R-TWT information of the second AP in response to the first frame

2304

MULTI-ACCESS POINT TARGET WAKE TIME INFORMATION REQUEST

CROSS-REFERENCE TO RELATED APPLICATIONS

This application is a continuation of International Application No. PCT/US2024/030319, filed May 21, 2024, which claims the benefit of U.S. Provisional Application No. 63/468,829, filed May 25, 2023, all of which are hereby incorporated by reference in their entireties.

BRIEF DESCRIPTION OF THE DRAWINGS

Examples of several of the various embodiments of the present disclosure are described herein with reference to the drawings.

FIG. 18 illustrates an example process according to an embodiment.

FIG. 21 illustrates another example process according to an embodiment.

FIG. 22 illustrates another example process according to an embodiment.

DETAILED DESCRIPTION

Figure 1:
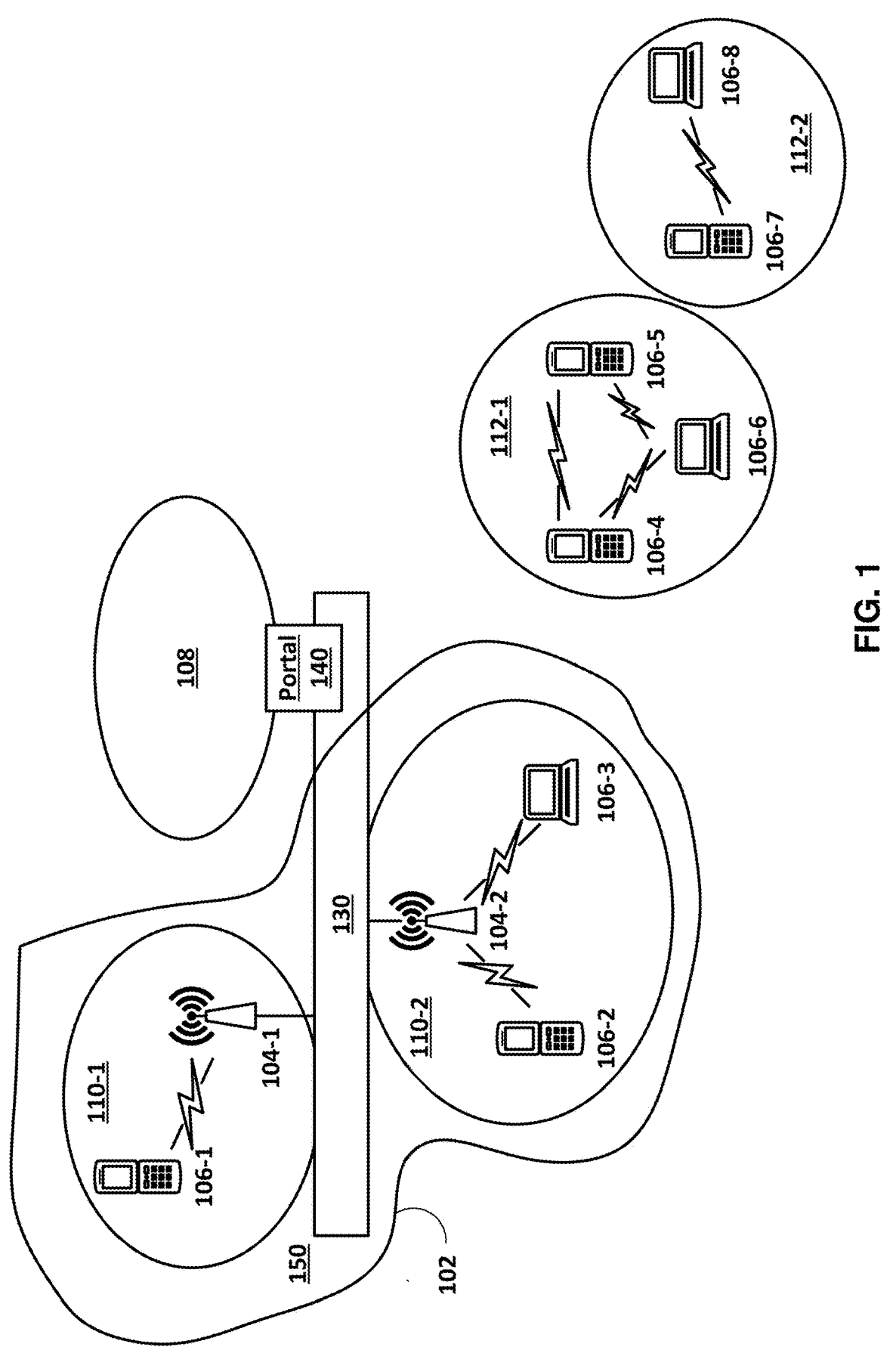
FIG. 1 illustrates example wireless communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. After reading the description, it will be apparent to one skilled in the relevant art how to implement alternative embodiments. The present embodiments may not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages are presented for example purposes only. The disclosed architecture is sufficiently flexible and configurable, such that it may be utilized in ways other than those shown. For example, the actions listed in any flowchart may be re-ordered or only optionally used in some embodiments.

Embodiments may be configured to operate as needed. The disclosed mechanism may be performed when certain criteria are met, for example, in a station, an access point, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, may be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={STA1, STA2} are: {STA1}, {STA2}, and {STA1, STA2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages/frames comprise a plurality of parameters, it implies that a parameter in the plurality of parameters is in at least one of the one or more messages/frames but does not have to be in each of the one or more messages/frames.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g., hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers, and microprocessors are programmed using languages such as assembly, C, C++, or the like. FPGAS, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1 illustrates example wireless communication networks in which embodiments of the present disclosure may be implemented.

As shown in FIG. 1, the example wireless communication networks may include an Institute of Electrical and Electronic Engineers (IEEE) 802.11 (WLAN) infra-structure network 102. WLAN infra-structure network 102 may include one or more basic service sets (BSSs) 110 and 120 and a distribution system (DS) 130.

BSS 110-1 and 110-2 each includes a set of an access point (AP or AP STA) and at least one station (STA or non-AP STA). For example, BSS 110-1 includes an AP 104-1 and a STA 106-1, and BSS 110-2 includes an AP 104-2 and STAs 106-2 and 106-3. The AP and the at least one STA in a BSS perform an association procedure to communicate with each other.

DS 130 may be configured to connect BSS 110-1 and BSS 110-2. As such, DS 130 may enable an extended service set (ESS) 150. Within ESS 150, APs 104-1 and 104-2 are connected via DS 130 and may have the same service set identification (SSID).

WLAN infra-structure network 102 may be coupled to one or more external networks. For example, as shown in FIG. 1, WLAN infra-structure network 102 may be connected to another network 108 (e.g., 802.X) via a portal 140. Portal 140 may function as a bridge connecting DS 130 of WLAN infra-structure network 102 with the other network 108.

The example wireless communication networks illustrated in FIG. 1 may further include one or more ad-hoc networks or independent BSSs (IBSSs). An ad-hoc network or IBSS is a network that includes a plurality of STAs that are within communication range of each other. The plurality of STAs are configured so that they may communicate with each other using direct peer-to-peer communication (i.e., not via an AP).

For example, in FIG. 1, STAs 106-4, 106-5, and 106-6 may be configured to form a first IBSS 112-1. Similarly, STAs 106-7 and 106-8 may be configured to form a second IBSS 112-2. Since an IBSS does not include an AP, it does not include a centralized management entity. Rather, STAs within an IBSS are managed in a distributed manner. STAs forming an IBSS may be fixed or mobile.

A STA as a predetermined functional medium may include a medium access control (MAC) layer that complies with an IEEE 802.11 standard. A physical layer interface for a radio medium may be used among the APs and the non-AP stations (STAs). The STA may also be referred to using various other terms, including mobile terminal, wireless device, wireless transmit/receive unit (WTRU), user equipment (UE), mobile station (MS), mobile subscriber unit, or user. For example, the term "user" may be used to denote a STA participating in uplink Multi-user Multiple Input, Multiple Output (MU MIMO) and/or uplink Orthogonal Frequency Division Multiple Access (OFDMA) transmission.

A physical layer (PHY) protocol data unit (PPDU) may be a composite structure that includes a PHY preamble and a payload in the form of a PHY service data unit (PSDU). For example, the PSDU may include a PHY preamble and header and/or one or more MAC protocol data units (MPDUs). The information provided in the PHY preamble may be used by a receiving device to decode the subsequent data in the PSDU. In instances in which PPDUs are transmitted over a bonded channel (channel formed through channel bonding), the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

A frequency band may include one or more sub-bands or frequency channels. For example, PPDUs conforming to the IEEE 802.11n, 802.11ac, 802.11ax and/or 802.11be standard amendments may be transmitted over the 2.4 GHZ, 5 GHZ, and/or 6 GHz bands, each of which may be divided into multiple 20 MHz channels. The PPDUs may be transmitted over a physical channel having a minimum bandwidth of 20 MHz. Larger channels may be formed through channel bonding. For example, PPDUs may be transmitted over physical channels having bandwidths of 40 MHz, 80 MHz, 160 MHz, or 320 MHz by bonding together multiple 20 MHz channels.

Figure 2:
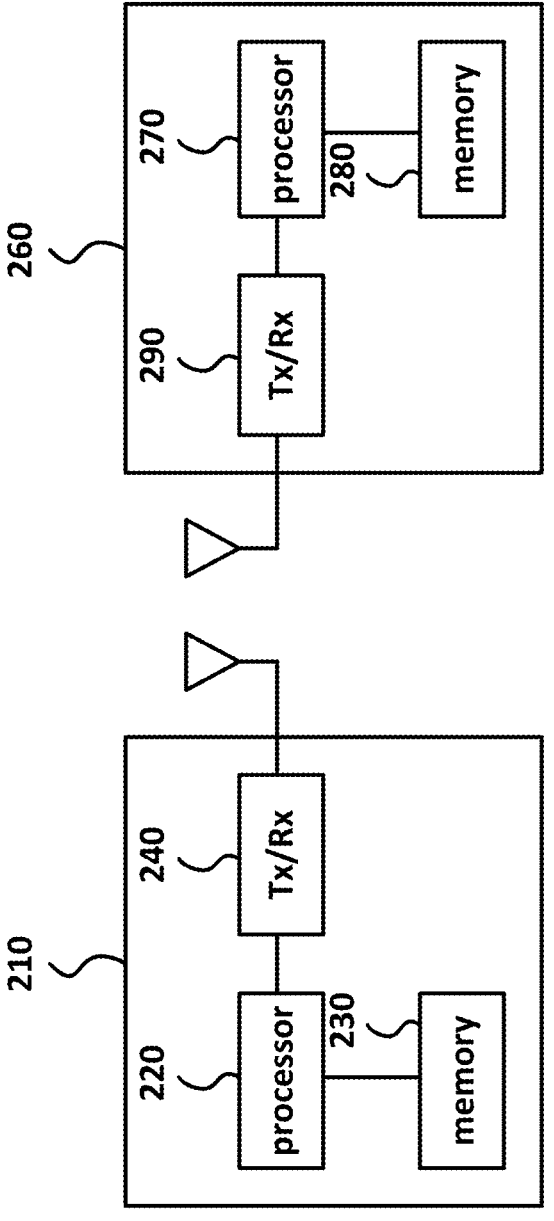
FIG. 2 is a block diagram illustrating example implementations of a station (STA) and an access point (AP).

FIG. 2 is a block diagram illustrating example implementations of a STA 210 and an AP 260. As shown in FIG. 2, STA 210 may include at least one processor 220, a memory 230, and at least one transceiver 240. AP 260 may include at least one processor 270, a memory 280, and at least one transceiver 290. Processor 220/270 may be operatively connected to memory 230/280 and/or to transceiver 240/290.

Processor 220/270 may implement functions of the PHY layer, the MAC layer, and/or the logical link control (LLC) layer of the corresponding device (STA 210 or AP 260). Processor 220/270 may include one or more processors and/or one or more controllers. The one or more processors and/or one or more controllers may comprise, for example, a general-purpose processor, a digital signal processor (DSP), a microcontroller, an application specific integrated circuit (ASIC), a field programmable gate array (FPGA), a logic circuit, or a chipset, for example.

Memory 230/280 may include a read-only memory (ROM), a random-access memory (RAM), a flash memory, a memory card, a storage medium, and/or other storage unit. Memory 230/280 may comprise one or more non-transitory computer readable mediums. Memory 230/280 may store computer program instructions or code that may be executed by processor 220/270 to carry out one or more of the operations/embodiments discussed in the present application. Memory 230/280 may be implemented (or positioned)

within processor 220/270 or external to processor 220/270. Memory 230/280 may be operatively connected to processor 220/270 via various means known in the art.

Transceiver 240/290 may be configured to transmit/receive radio signals. In an embodiment, transceiver 240/290 may implement a PHY layer of the corresponding device (STA 210 or AP 260). In an embodiment, STA 210 and/or AP 260 may be a multi-link device (MLD), that is a device capable of operating over multiple links as defined by the IEEE 802.11 standard. As such, STA 210 and/or AP 260 may each implement multiple PHY layers. The multiple PHY layers may be implemented using one or more of transceivers 240/290.

Target wake time (TWT), a feature introduced in the IEEE 802.11ah standard, allows STAs to manage activity in the BSS by scheduling STAs to operate at different times to reduce contention. TWTs may allow STAs to reduce the required amount of time that a STA utilizing a power management mode may be awake. TWTs may be individual TWTs or broadcast TWTs. Individual TWTs follow a negotiated TWT agreement between STAs. Broadcast TWTs are based on a schedule set and provided to STAs by an AP.

In an individual TWT, a STA that requests a TWT agreement is called a TWT requesting STA. The TWT requesting STA may be a non-AP STA for example. The STA that responds to the request is called a TWT responding STA. The TWT responding STA may be an AP for example. The TWT requesting STA is assigned specific times to wake up and exchange frames with the TWT responding STA. The TWT requesting STA may communicate wake scheduling information to the TWT responding STA. The TWT responding STA may transmit TWT values to the TWT requesting STA when a TWT agreement is established between them.

When explicit TWT is employed, the TWT requesting STA may wake up and perform a frame exchange. The TWT requesting STA may receive a next TWT information in a response from the TWT responding STA. When implicit TWT is used, the TWT requesting STA may calculate a next TWT by adding a fixed value to the current TWT value.

The TWT values for implicit TWT may be periodic. The TWT requesting STA operating with an implicit TWT agreement may determine a next TWT service period (TWT SP) start time by adding a value of a TWT wake interval associated with the TWT agreement to the value of the start time of the current TWT SP. The TWT responding STA may include the start time for a series of TWT SPs corresponding to a single TWT flow identifier of an implicit TWT agreement in a target wake time field of a TWT element. The TWT element may contain a value of 'accept TWT' in a TWT setup command field. The start time of the TWT SP series may indicate the start time of a first TWT SP in the series. Start times of subsequent TWT SPs may be determined by adding the value of the TWT wake interval to the start time of the current TWT SP. In an example, the TWT requesting STA, awake for an implicit TWT SP, may enter a doze state after the TWT SP has elapsed or after receiving an end of service period (EOSP) field equal to 1 from the TWT responding STA, whichever occurs first.

A TWT session may be negotiated between an AP and a STA. The TWT session may configure a TWT SP of DL and UL traffic between the AP and the STA. Expected traffic may be limited within the negotiated SP. The TWT SP may start at a specific time. The TWT SP may run for an SP duration. The TWT SP may repeat every SP interval.

Figure 3:
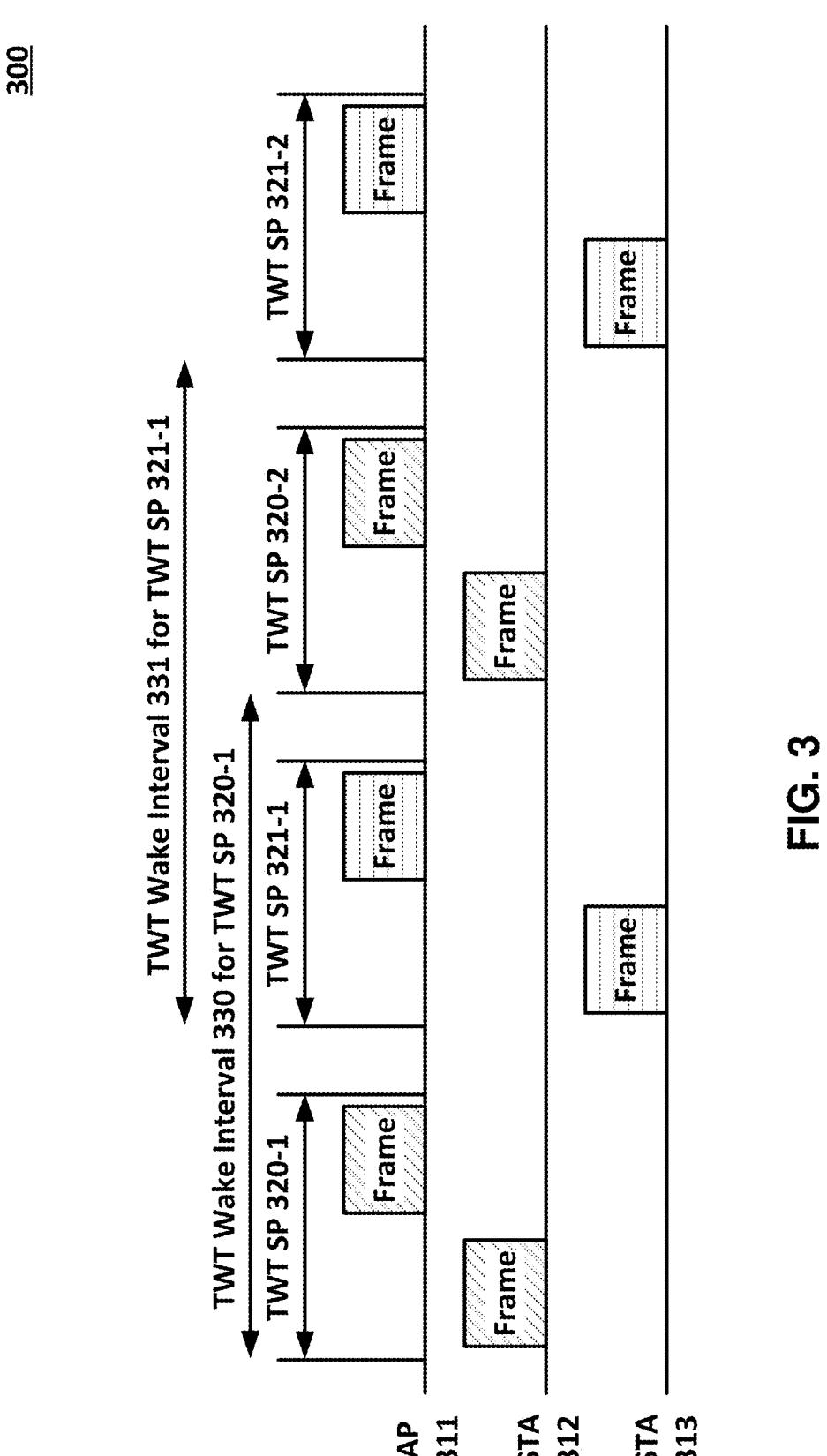
FIG. 3 illustrates an example of target wake time (TWT) operation.

FIG. 3 illustrates an example 300 of TWT operation. As shown in FIG. 3, example 300 includes an AP 311, a STA

312, and a STA 313. AP 311 and STA 312 may establish a TWT SP 320. AP 311 and STA 313 may establish a TWT SP 321. TWT SP 320 and TWT SP 321 may repeat as shown in FIG. 3, such that TWT SP 320 may include a first TWT SP 320-1 and a second TWT SP 320-2, and such that TWT SP 321 may include a first TWT SP 321-1 and a second TWT SP 321-2.

AP 311 and STA 312 may exchange frames during first TWT SP 320-1. STA 312 may enter a doze state at the end of TWT SP 320-1 and may remain in the doze state until the start of second TWT SP 320-2. The start of second TWT SP 320-2 may be indicated by a TWT wake interval 330 associated with TWT SP 320. AP 311 and STA 312 may again exchange frames during second TWT SP 320-2.

Similarly, AP 311 and STA 313 may exchange frames during first TWT SP 321-1. STA 313 may enter a doze state at the end of first TWT SP 321-1 and may remain in the doze state until the start of second TWT SP 321-2. The start of second TWT SP 321-2 may be indicated by a TWT wake interval 331 associated with TWT SP 321. AP 311 and STA 313 may again exchange frames during second TWT SP 31-2.

In an awake state, a STA may be fully powered. The STA may transmit and/or receive a frame to/from an AP or another STA. In a doze state, a STA may not transmit and may not receive a frame to/from an AP or another STA.

An MLD is an entity capable of managing communication over multiple links. The MLD may be a logical entity and may have more than one affiliated station (STA). The MLD may have a single MAC service access point (MAC-SAP) to the LLC layer, which includes a MAC data service. An MLD may be an access point MLD (AP MLD) when a STA affiliated with the MLD is an AP STA (or an AP). An MLD may be a non-access point MLD (non-AP MLD) or STA MLD when a STA affiliated with the MLD is a non-AP STA (or a STA).

During negotiation of TWT agreements, a TWT requesting STA affiliated with a STA MLD and a TWT responding STA affiliated with an AP MLD may communicate multiple TWT elements. The TWT elements may comprise link ID bitmap subfields indicating different link(s) in a TWT setup frame. The TWT parameters provided by a TWT element may be applied to the respective link that is indicated in the TWT element.

Figure 4:
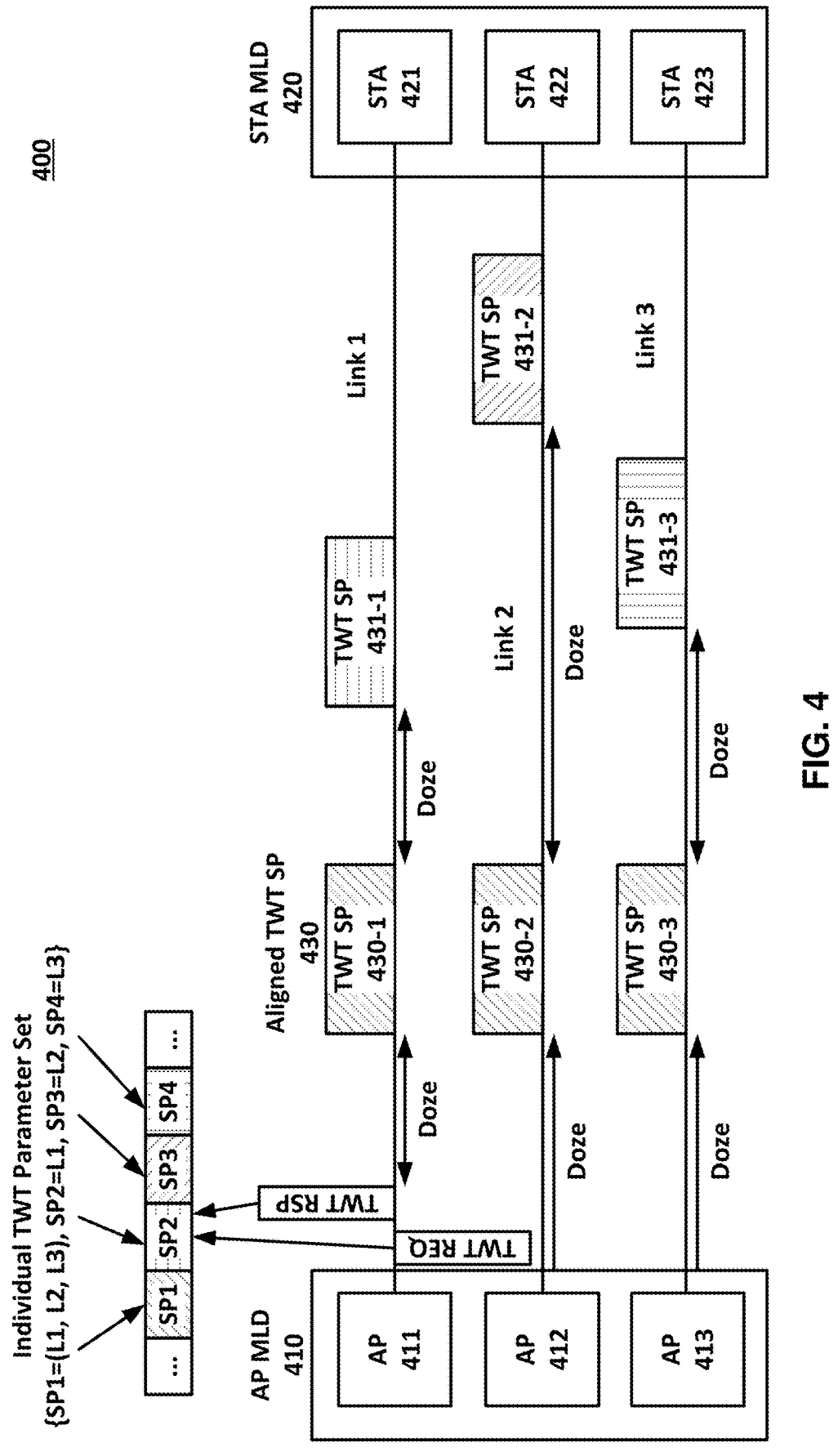
FIG. 4 illustrates an example of TWT operation in an environment including an AP multi-link device (AP MLD) and a station multi-link device (STA MLD).

FIG. 4 illustrates an example 400 of TWT operation in a multi-link environment including an AP multi-link device (AP MLD) 410 and a STA multi-link device (STA MLD) 420. As shown in FIG. 4, AP MLD 410 may have three affiliated APs, AP 411, AP2 412, and AP3 413. In an example, AP 411, AP2 412, and AP3 413 may operate respectively on the 2.4 GHz band, the 5 GHz band, and the 6 GHz band. STA MLD 420 may have three affiliated STAs, STA 421, STA 422, and STA 423. In an example, STA 421, STA 422, and STA 423 may operate respectively on the 2.4 GHz band, the 5 GHz band, and the 6 GHz band. In an example, AP 411, AP2 412, and AP3 413 may be communicatively coupled via a first link (link 1), a second link (link 2), and a third link (link 3) respectively with STA 421, STA 422, and STA 423, respectively.

In an example, STA 421 may transmit a TWT request to AP 411. The TWT request may include three TWT elements. Each TWT element may indicate a respective link of links 1-3 and may request the setup of a TWT agreement for the indicated link. The three TWT elements may have different TWT parameters, such as target wake time (TWT). In response to the TWT request, AP 411 may transmit a TWT response to STA 421. The TWT response may include three TWT elements. Each TWT element may indicate a respective link of links 1-3 and may include a value of 'accept TWT' in a TWT setup command field.

Successful TWT agreement setup on links 1-3 establishes three TWT SPs with same or different TWT parameters on links 1-3 respectively. The target wake time field of the TWT element indicating a given link indicates the start time of the TWP SP for that link. The starting time may be indicated in reference to a time synchronization function (TSF) time of the link.

In example 400, initial TWT SPs 430-1, 430-2, and 430-3 of links 1-3 respectively may be aligned. TWT wake intervals associated with the TWT agreements of links 1-3 respectively may be set differently. As such, second TWT SPs 431-1, 431-2, and 431-3 of links 1-3 respectively may not be aligned. STA 421, STA 422, and STA 423 may enter a doze state between the end of initial TWT SPs 430-1, 430-2, and 430-3, respectively, and the start of second TWT SPs 431-1, 431-2, 431-3, respectively.

Figure 5:
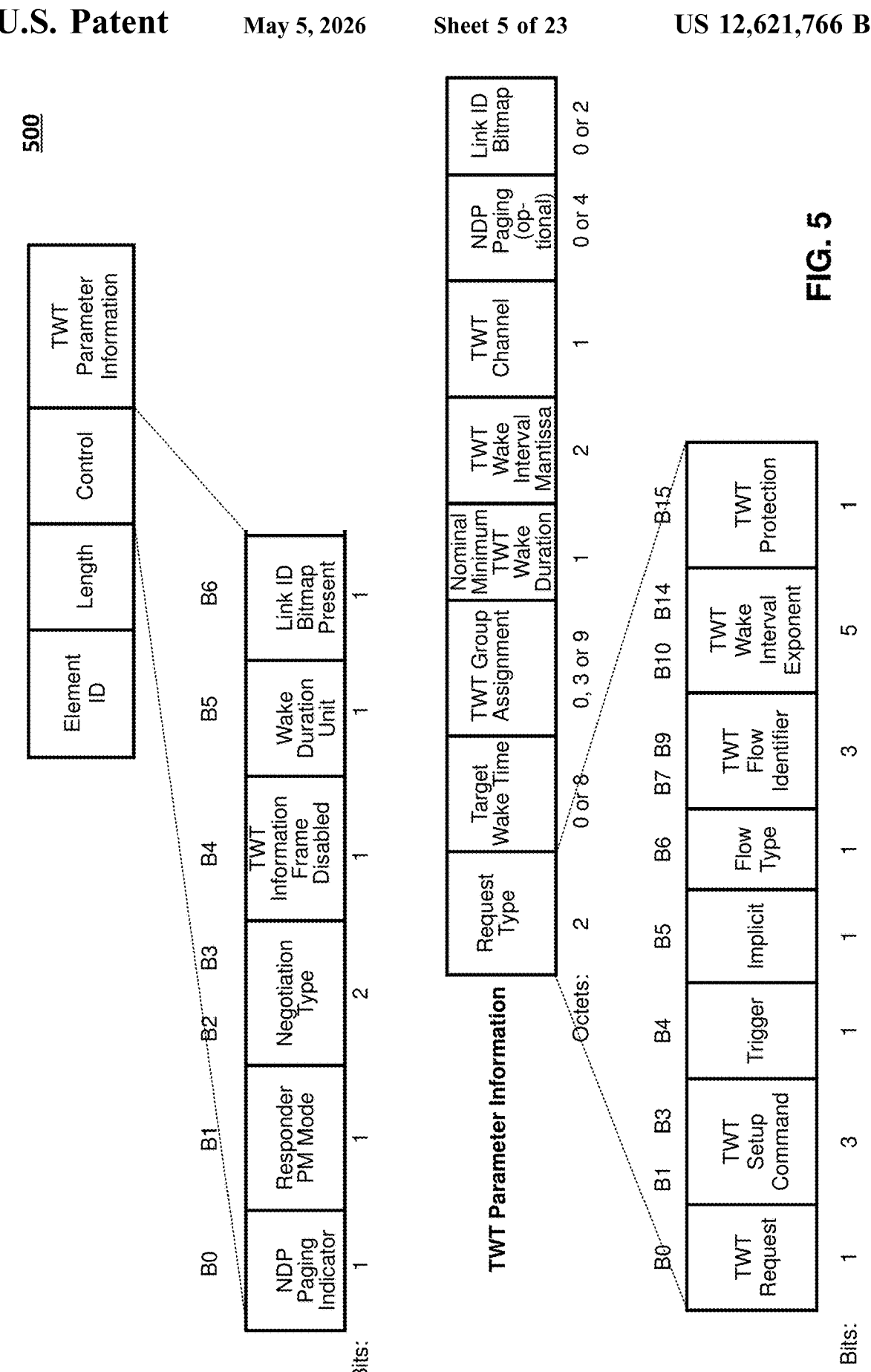
FIG. 5 illustrates an example TWT element which may be used to support individual TWT operation.

FIG. 5 illustrates an example target wake time (TWT) element 500 which may be used to support individual TWT operation.

In an example, an AP and a STA may use TWT element 500 to negotiate a TWT agreement. The AP and/or the STA may transmit TWT element 500 in an individually addressed management frame. The management frame may be of the type action, action no ack, (re) association request/response, and probe request response, for example.

The TWT schedule and parameters may be provided during a TWT setup phase. Renegotiation/changes of TWT schedules may be signaled via individually addressed frames that contain the updated TWT schedule/parameters. The frames may be management frames as described above or control or data frames that carry a field containing the updated TWT schedule/parameters.

Referring to FIG. 5, TWT element 500 includes an element ID field, a length field, a control field, and a TWT parameter information field.

The element ID field (e.g., 1 octet in length) may indicate that information element 500 is a TWT element. The length field (e.g., 1 octet) may indicate the length of TWT element 500 starting from the control field until an end of TWT element 500. The end of TWT element 500 may be the end of a TWT Channel field or the end of a Link ID bitmap field of the TWT parameter information field.

The TWT parameter information field may include a request type field (e.g., 2 octets), a target wake time field (e.g., 8 octets or less), a TWT group assignment field (e.g., 9, 3, 2, or 0 octets), a nominal minimal TWT wake duration field (e.g., 1 octet), a TWT wake interval mantissa (e.g., 2 octets), a TWT channel field (e.g., 1 octet), an optional NDP paging field (e.g., 0 or 4 octets), and/or a Link ID bitmaps field (e.g., 0 or 2 Octets).

The request type field may indicate a type of TWT request. The request type field may include a TWT request field (e.g., 1 bit), a TWT setup command field (e.g., 3 bits), a trigger field (e.g., 1 bit), an implicit field (e.g., 1 bit), a flow type (e.g., 1 bit), a TWT flow identifier (e.g., 3 bits), a TWT wake interval exponent (e.g., 5 bits), and/or a TWT protection field (e.g., 1 bit).

The TWT request field may indicate whether the TWT element 500 represents a request. If TWT request field has a value of 1, then the TWT element 500 may represent a request to initiate TWT scheduling/setup.

The TWT setup command field may indicate a type of TWT command. In a TWT request, the type of TWT command indicated may be: a request TWT (the TWT responding STA specifies the TWT value; e.g., field set to 0), a suggest TWT (the TWT requesting STA suggests a TWT value; e.g., field set to 1), and a demand TWT (the TWT requesting STA demands a TWT value; e.g., field set to 2).

In a TWT response, the type of TWT command indicated may be: TWT grouping (the TWT responding STA suggests TWT group parameters that are different than the suggested or demanded TWT parameters of the TWT requesting STA; e.g., field set to 3), accept TWT (the TWT responding STA accepts the TWT request with the TWT parameters indicated by the TWT requesting STA; e.g. field set to 4), alternate TWT (the TWT responding STA suggests TWT parameters that are different than the parameters suggested or demanded by the TWT requesting STA; e.g., field set to 5), dictate TWT (the TWT responding STA demands TWT parameters that are different than the parameters suggested or demanded by the TWT requesting STA; e.g., field set to 6), or reject TWT (the TWT responding STA rejects the TWT setup; e.g. field set to 7).

In a TWT response, the TWT command may also indicate an unsolicited response or a broadcast TWT. An unsolicited TWT response is an individually addressed frame that is intended for a specific STA. An unsolicited TWT response may be followed by an ACK frame from the STA receiving the unsolicited TWT response. A broadcast TWT may be intended for multiple STAs and may be carried in a broadcast frame such as, for example, a beacon frame. A broadcast TWT may not be acknowledged by receiving STAs.

An unsolicited TWT response may be used a TWT responding STA to demand that a recipient follow a TWT schedule contained in the TWT element. In an embodiment, an unsolicited TWT response may have the TWT request field set to 0 and a value of 'dictate TWT' in the TWT setup command field. A broadcast TWT response may be used by a TWT responding STA to schedule a TWT for any STA that receives and decodes the TWT element.

In certain embodiments, a TWT element, such as TWT element 500, may contain TWT parameter sets for multiple TWT negotiations or indications as described herein. As such, the TWT element may include multiple instances of the Control and the TWT parameter information fields. The TWT flow identifier of the request type field indicates the TWT negotiation which parameters are carried by the TWT parameter information field.

Figure 6:
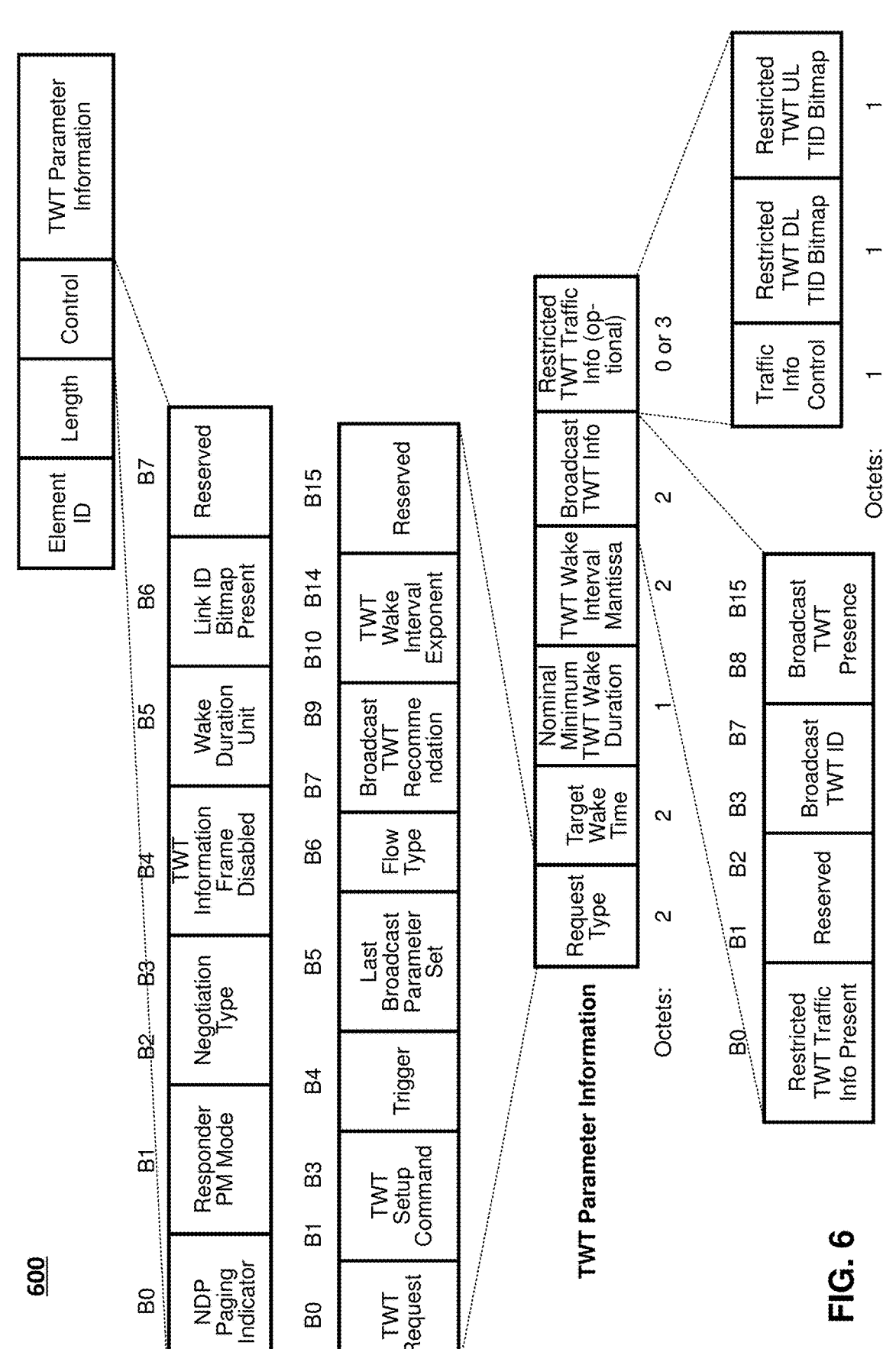
FIG. 6 illustrates an example TWT element which may be used to support restricted TWT (R-TWT) operation.

FIG. 6 illustrates an example target wake time (TWT) element 600 which may be used to support restricted TWT (R-TWT) operation. For R-TWT, TWT element 600 may be transmitted in a broadcast management frame, which can be a beacon frame, a TIM broadcast frame, a probe response frame, etc. In this embodiment, TWT element 600 provides non-negotiated TWT schedules (e.g., broadcast TWT schedules).

As shown, TWT element 600 includes an element ID field, a length field, a control field, and a TWT parameter information field.

The element ID field (e.g., 1 octet in length) may indicate that information element 600 is a TWT element. The length field (e.g., 1 octet) may indicate the length of TWT element 600 starting from the control field until an end of TWT element 600. The end of TWT element 600 may be the end of a broadcast TWT info field or the end of an R-TWT traffic info field of the TWT parameter information field.

The TWT parameter information field may include a request type field, a target wake time field (e.g., 2 octets), a nominal minimal TWT wake duration field (e.g., 1 octet), a TWT wake interval mantissa (e.g., 2 octets), a broadcast TWT info field (e.g., 2 octets), and an optional R-TWT traffic info field (e.g., 0 or 3 octets).

The request type field may include, among other fields, a TWT request field, a flow type field, and a TWT wake interval exponent field.

The TWT request field indicates whether TWT element 600 is a request. If the TWT request field has a value of 0, then TWT element 600 may represent a response to a request to initiate TWT scheduling/setup (solicit TWT), an unsolicited TWT response, and/or a broadcast TWT message.

The TWT wake interval represents the average time that a TWT requesting STA or a TWT scheduled STA expects to elapse between successive TWT SP start times of a TWT schedule. The TWT wake interval exponent field indicates a (base 2) exponent used to calculate the TWT wake interval in microseconds. In an embodiment, the TWT wake interval is equal to: (TWT wake interval mantissa)×2 (TWT Wake Interval Exponent). The TWT wake interval mantissa value is indicated in microseconds, base 2 in a TWT wake interval mantissa field of the TWT parameter information field.

The nominal minimum TWT wake duration field may indicate the minimum amount of time (in the unit indicated by a wake duration unit subfield of the control field) that a TWT requesting STA or a TWT scheduled STA is expected to be awake to complete frame exchanges for the period of the TWT wake interval.

The flow type field, in a TWT response that successfully set up a TWT agreement between a TWT requesting STA and a TWT responding STA, may indicate a type of interaction between the TWT requesting STA and the TWT responding STA within a TWT SP of the TWT agreement. A flow type field equal to 0 may indicate an announced TWT. In an announced TWT, the TWT responding STA may not transmit a frame to the TWT requesting STA within a TWT SP until the TWT responding STA receives a PS-Poll frame or a QoS Null frame from the TWT requesting STA. A flow type field equal to 1 may indicate an unannounced TWT. In an unannounced TWT, the TWT responding STA may transmit a frame to the TWT requesting STA within a TWT SP before it has received a frame from the TWT requesting STA.

Within a TWT element that includes a TWT setup command value of 'request TWT', 'suggest TWT', or 'demand TWT', a broadcast TWT ID may indicate a specific broadcast TWT in which the TWT requesting STA is requesting to participate. Within a TWT element that includes a TWT setup command value of 'accept TWT', 'alternate TWT', 'dictate TWT', or 'reject TWT', a broadcast TWT ID may indicate a specific broadcast TWT for which the TWT responding STA is providing TWT parameters. The value 0 in the broadcast TWT ID subfield may indicate the broadcast TWT whose membership corresponds to all STAs that are members of the BSS corresponding to the BSSID of the management frame carrying the TWT element and that is permitted to contain trigger frames with random access resource units for unassociated STAs. The Broadcast TWT ID subfield in an R-TWT Parameter set field is always set to a nonzero value.

A broadcast TWT element 600 that contains an R-TWT parameter set is also referred to as an R-TWT element. A R-TWT traffic info present subfield of the broadcast TWT info field may be set to 1 to indicate the presence of the R-TWT traffic info field in TWT element 600. The R-TWT traffic info field is present in an R-TWT parameter set field when the R-TWT traffic info present subfield is set to 1.

The R-TWT traffic info field may include a traffic info control field, an R-TWT DL TID bitmap field, and an R-TWT UL TID bitmap field.

The traffic info control field may include a DL TID bitmap valid subfield and an UL TID bitmap valid subfield. The DL TID bitmap valid subfield indicates if the R-TWT DL TID bitmap field has valid information. When the value of the DL TID bitmap valid subfield is set to 0, it may indicate that DL traffic of TIDs is identified as latency sensitive traffic, and the R-TWT DL TID bitmap field is reserved. The UL TID bitmap valid subfield may indicate if the R-TWT UL TID bitmap field has valid information. When the value of the UL TID bitmap valid subfield is set to 0, it may indicate that UL traffic of TIDs is identified as latency sensitive traffic, and the R-TWT UL TID bitmap field is reserved.

The R-TWT DL TID bitmap subfield and the R-TWT UL TID bitmap subfield may specify which TID(s) are identified by the TWT scheduling AP or the TWT scheduled STA as latency sensitive traffic streams in a downlink and an uplink direction, respectively. A value of 1 at bit position k in the bitmap indicates that TID k is classified as a latency sensitive traffic stream. A value of 0 at bit position k in the bitmap indicates that TID k is not classified as a latency sensitive traffic stream.

An individual target wake time (TWT) may be a specific time or set of times negotiated between two individual stations (e.g., a STA and another STA, or a STA and an AP, etc.) at which the stations may be awake to exchange frames during a service period (SP) of the TWT.

In trigger-enabled TWT, an AP may transmit a trigger frame for scheduling uplink multi-user transmissions from one or more STAs using uplink OFDMA (orthogonal frequency division multiple access) and/or uplink MU-MIMO (multi-user multiple input multiple output) during a trigger-enabled TWT SP. A TWT STA that receives the trigger frame from the AP may transmit a frame to the AP through a resource indicated in the trigger frame during the trigger-enabled TWT SP.

In non-trigger-enabled TWT, an AP may not be required to transmit a trigger frame to schedule uplink multi-user transmissions from one or more STAs during a non-trigger-enabled TWT SP.

In announced TWT, a STA may transmit a frame (e.g., a PS-Poll frame or a QoS null frame) to the AP to retrieve a downlink buffered data from the AP during a TWT SP. In unannounced TWT, an AP may transmit downlink data to a TWT STA without receiving a frame (e.g., a PS-Poll frame, or a QoS null frame) from the TWT STA during a TWT SP.

Figure 7:
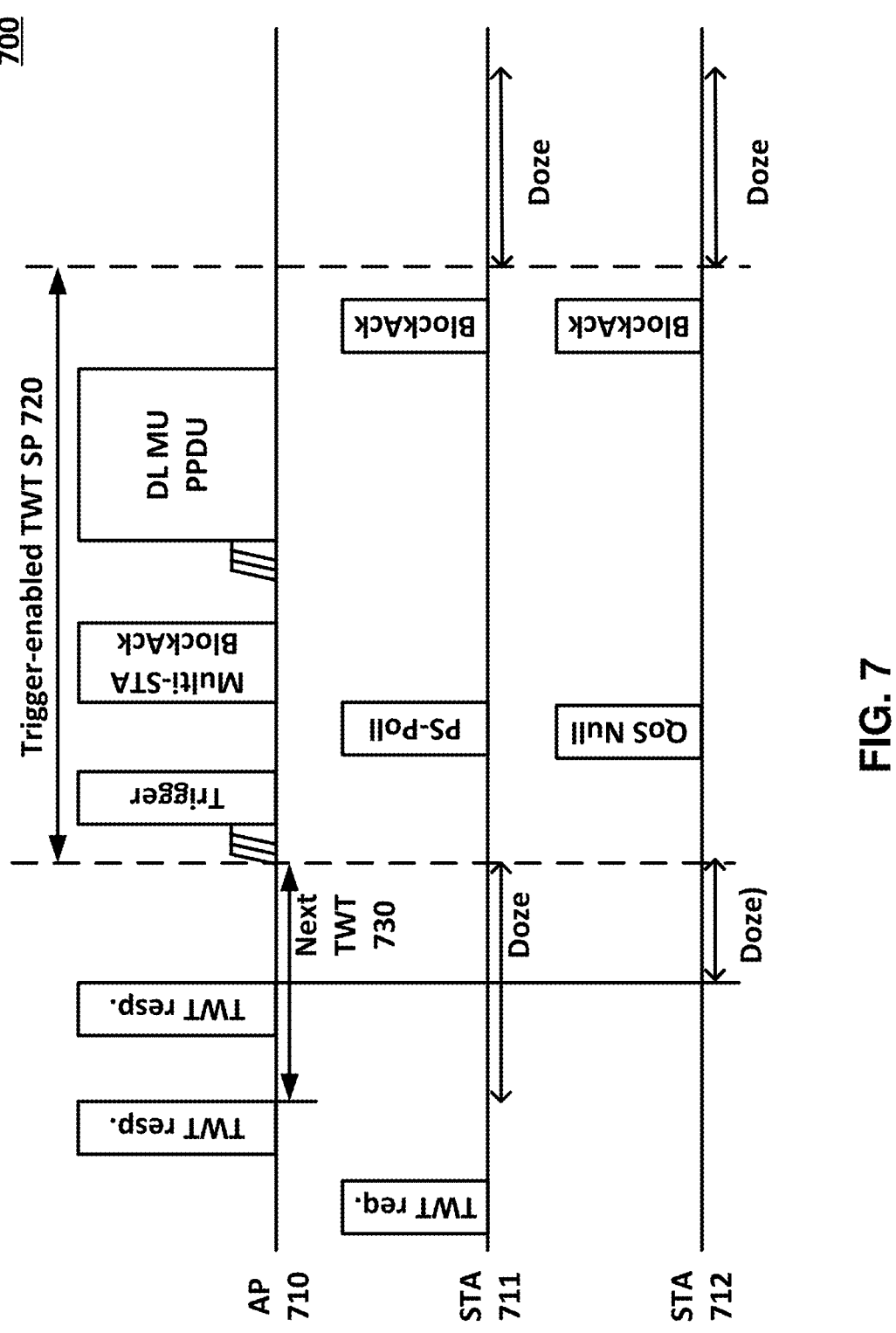
FIG. 7 illustrates an example of individual TWT operation.

FIG. 7 illustrates an example 700 of individual TWT operation. As shown in FIG. 7, example 700 includes an AP 710, a STA 711, and a STA 712. In an example, AP 710 may be a TWT responding STA and STA 711 and STA 712 may be TWT requesting STAs.

In an example, STA 711 may transmit a TWT request to AP 710 to setup a first trigger-enabled TWT agreement. STA 711 may set a trigger field of the TWT request to 1 to indicate that it is requesting a trigger-enabled TWT. AP 710 may accept the first TWT agreement with STA 711. AP 710 may confirm the acceptance in a TWT response sent to STA 711. The TWT response may indicate a next TWT 730, which indicates the time until a next TWT SP 720 according to the first TWT agreement.

In an example, AP 710 may transmit an unsolicited TWT response to STA 712 to set up a second trigger-enabled TWT agreement with STA 712 without receiving a TWT request from STA 712. The first and second TWT agreements may be set up as announced TWTs.

After the setup of the TWT agreements, STA 711 and STA 712 may enter a doze state until the start of TWT SP 720. During trigger-enabled TWT SP 720, AP 710 may transmit a trigger frame. STA 711 and STA 12 may respond to the trigger frame by indicating that they are in awake state. In an example, STA 711 may transmit a power save poll (PS-Poll) frame. The PS-Poll frame may comprise a BSSID (receiver address: RA) field set to an address of AP 710 and a transmitter address (TA) field set to an address of STA 711. In an example, STA 712 may transmit a QoS null frame in response to the trigger frame. The QoS null frame may comprise a MAC header (e.g., a frame control field, a duration field, address fields, a sequence control field, QoS control field) without a frame body.

In response to the PS-Poll frame and the QoS null frame, AP 710 may transmit a multi-STA Block Ack (M-BA) frame. The M-BA frame may include acknowledgement information associated with the PS-Poll frame and the QoS null frame received from STAs 711 and 712, respectively. Subsequently, STA 711 and STA 712 may receive downlink bufferable units (DL BUs) from AP 710. The DL BUs may include a medium access control (MAC) service data unit (MSDU), an aggregate MAC service data unit (A-MSDU), and/or a bufferable MAC management protocol data unit (MMPDU). STA 711 and STA 712 may transmit Block Ack (BA) frames in response to the DL BUs. At the end of the TWT SP 720, STA 711 and STA 712 may return to a doze state.

A STA may execute individual TWT setup exchanges. The STA may not transmit frames to an AP outside of negotiated TWT SPs. The STA may not transmit frames that are not contained within high efficiency trigger-based physical protocol data units (HE TB PPDUs) to the AP within trigger-enabled TWT SPs. A HE TB PPDU may be transmitted by a STA based on receiving a trigger frame triggering uplink multi-user transmissions.

The AP of a trigger-enabled TWT agreement may schedule for transmission a trigger frame for a STA within the trigger-enabled TWT SP. The STA may transmit an HE TB PPDU as a response to the trigger frame sent during the trigger-enabled TWT SP. A STA that is in power save (PS) mode may include a PS-Poll frame or a QoS null frame in the HE TB PPDU if the TWT is an announced TWT, to indicate to the AP that the STA is currently in the awake state. The AP that receives the PS-Poll frame or the QoS Null frame or any other indication from an STA in PS mode, may deliver to the STA as many buffered BUs as are available at the AP during the TWT SP.

A broadcast target wake time (TWT) may be a specific time or set of times broadcast by an AP to one or more STAs at which the STAs may be awake to exchange frames with the AP during a SP of the TWT.

Figure 8:
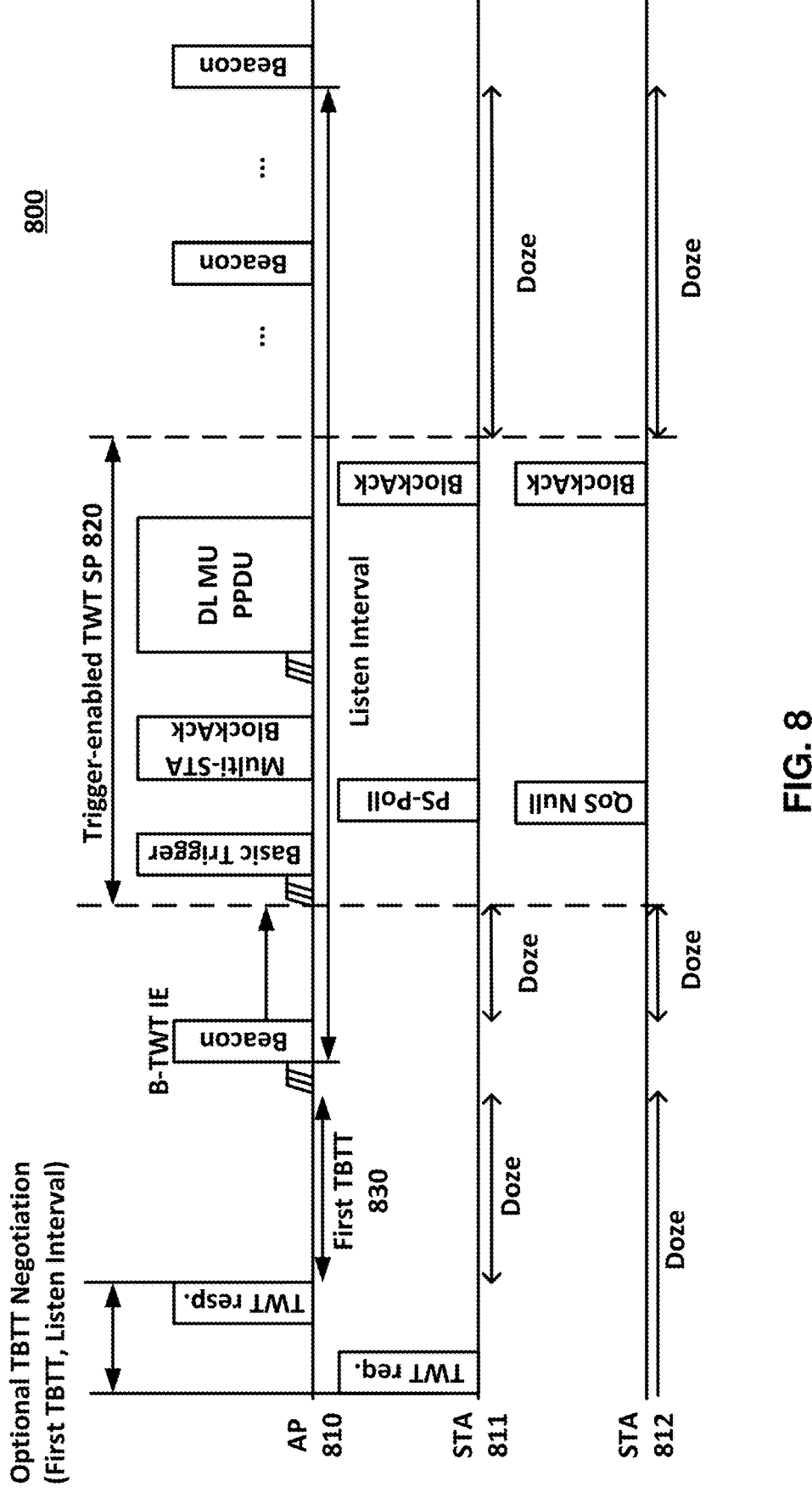
FIG. 8 illustrates an example of broadcast TWT operation.

FIG. 8 illustrates an example 800 of broadcast TWT operation. As shown in FIG. 8, example 800 includes an AP 810, a STA 811, and a STA 812. In an example 800, AP 810 may be a TWT scheduling AP and STA 811 and STA 812 may be TWT scheduled STAs.

In an example, AP 810 may include a broadcast TWT element in a beacon frame that indicates a broadcast TWT SP 820. During the broadcast TWT SP 820, AP 810 may transmit trigger frames or DL BUs to STA 811 and STA 812. Beacon frames may be sent by AP 810 periodically at target beacon transmission times (TBTTs). The number of time units (TUs) between consecutive TBTTs is called the beacon interval. A TU is equal to 1024 microseconds.

In an example, STA 811 and STA 812 may enter a doze state until the first target beacon transmission time (TBTT).

STA 811 and STA 812 may wake up to receive the beacon frame at the first TBTT to determine the broadcast TWT. Upon reception of a broadcast TWT element in a beacon frame, STA 811 and STA 812 may re-enter the doze state until the start of trigger-enabled TWT SP 820.

During trigger-enabled TWT SP 820, AP 810 may transmit a basic trigger frame to STA 811 and STA 812. STA 811 may indicate that it is awake by transmitting a PS-Poll, and STA 812 may indicate that it is awake by transmitting a QoS null frame in response to the basic trigger frame. Subsequently, STA 811 and STA 812 may receive DL BUs from AP 810. STA 811 and STA 812 may return to the doze state outside of the TWT SP 720.

In an example, a STA that intends to operate in power save mode may negotiate a wake TBTT and a wake interval with the AP. For example, as shown in FIG. 8, STA 811 may transmit a TWT request to AP 810 that identifies a wake TBTT of the first beacon frame and a wake interval between subsequent beacon frames. AP 810 may respond with a TWT response to the TWT request confirming the wake TBTT and wake interval. After successfully completing the negotiation, STA 811 may enter a doze state until a first negotiated wake TBTT 830. STA 811 may be in an awake state to listen to the beacon frame transmitted at first negotiated wake TBTT 830. If STA 811 receives a beacon frame from AP 810 at or after TBTT 830, STA 811 may return to the doze state until the next wake TBTT unless a traffic indication map (TIM) element in a beacon frame includes a positive indication for STA 811. The STA 811 may return to the doze state after a nominal minimum TBTT wake duration time has elapsed from the TBTT start time.

A Network Allocation Vector (NAV) is an indicator, maintained by a station (STA), of time periods when transmission onto the wireless medium (WM) may not be initiated by the STA regardless of whether the clear channel assessment (CCA) function of the STA senses that the WM is busy. A STA that receives at least one valid frame in a PSDU may update its NAV with the information from any valid duration field in the PSDU. The STA may update the NAV when a value of the received duration field is greater than the current NAV value of the STA.

A TWT protection is a mechanism employed to protect a TWT session from external STA transmissions. During a TWT SP configured to protect the TWT session, a STA that initiates a transmission opportunity (TXOP) to transmit a frame may transmit a request to transmit (RTS) frame or a clear to transmit (CTS) frame to protect the TWT session by setting the NAV of other STAs based on receiving of the RTS frame and/or the CTS frame. The RTS frame may comprise a frame control field, a duration field, a receiver address (RA) field, a transmitter address (TA) field, and a frame check sequence (FCS) field. The CTS frame may comprise a frame control field, a duration field, a receiver address (RA) field, and a frame check sequence (FCS) field.

The TWT protection field in a TWT element may indicate whether a TWT is protected or unprotected. A TWT requesting STA may set the TWT protection field to 1 to request the TWT responding STA to provide protection for the set of TWT SPs. A TWT protection field equal to 1 may indicate to use a NAV protection mechanism to protect access to the medium during the corresponding TWT SPs.

Figure 9:
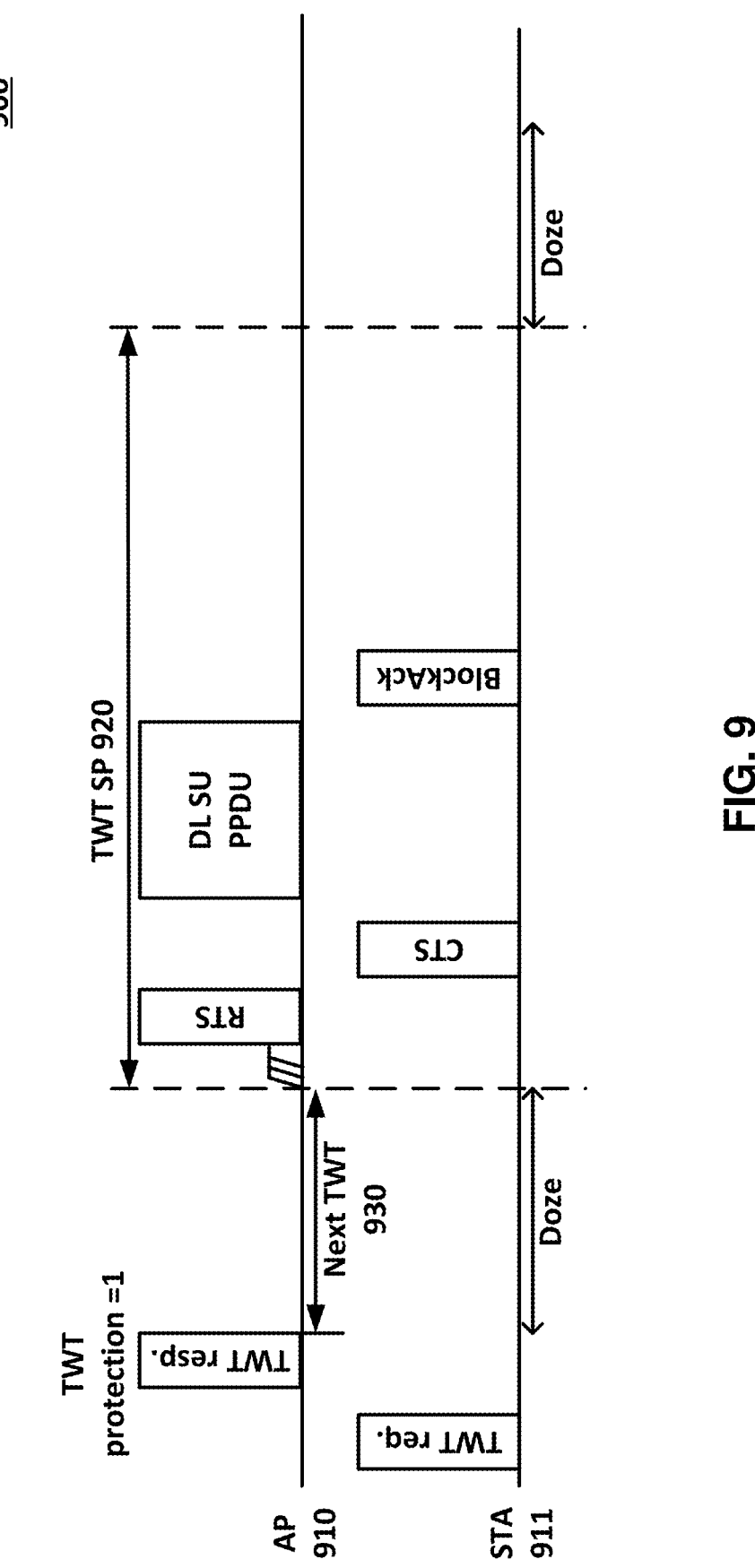
FIG. 9 illustrates an example of TWT protection in individual TWT operation.

FIG. 9 illustrates an example 900 of TWT protection in individual TWT operation. As shown in FIG. 9, example 900 includes an AP 910 and a STA 911.

In an example, AP 910 may set the TWT protection field to 1 in a TWT response frame to protect the TWT SPS using a NAV protection mechanism. Upon reception of the TWT response frame, STA 911 may enter a doze state until the next TWT 930. AP 910 that has set the TWT protection field to 1 may transmit a NAV setting frame at the start of the TWT SP 920. For example, the NAV setting frame may be an RTS frame or a CTS frame.

A STA that receives the NV setting frame and that is not scheduled to access the medium during the TWT SP 920 may set their NAV according to the NAV setting frame. The STA may not access the medium for the specified amount of time in the NAV setting frame.

STA 911 may be scheduled to access the medium during the TWT SP 920. STA 911 may respond to the RTS frame with a CTS frame. Upon receiving the CTS frame, AP 910 may transmit a downlink frame to STA 911. STA 911 may respond to the downlink frame with a BA frame. When the TWT SP 920 ends, STA 911 may return to the doze state.

Figure 10:
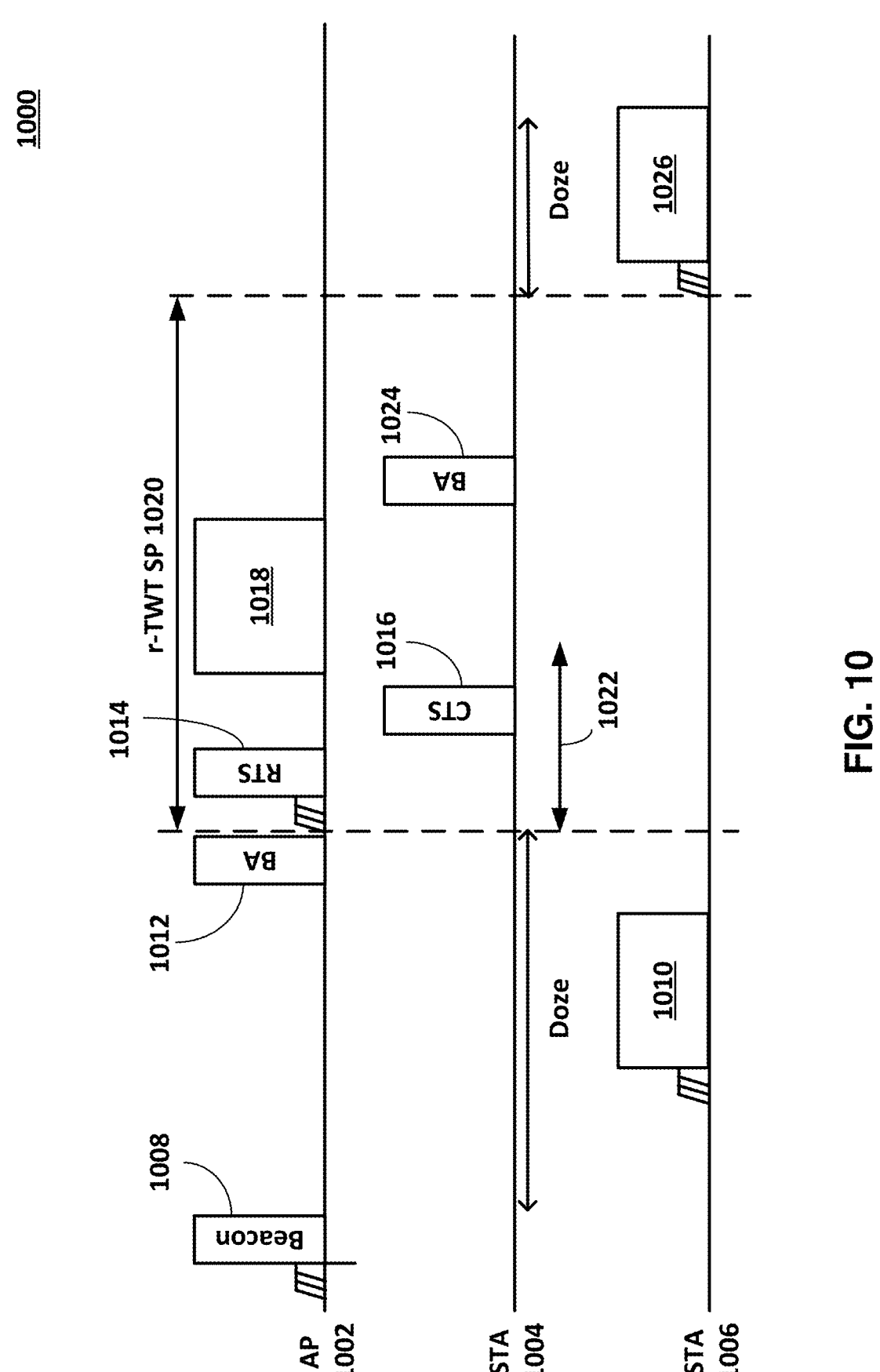
FIG. 10 illustrates an example of R-TWT operation.

FIG. 10 illustrates an example 1000 of R-TWT operation. As shown in FIG. 10, example 1000 includes an AP 1002, a STA 1004, and a STA 1006.

In an example, an R-TWT agreement (hereinafter "R-TWT") may be setup between AP 1002 and STA 1004. The R-TWT may not include STA 1006. For example, STA 1006 may be a legacy STA or an EHT STA not scheduled by AP 1002 as part of the R-TWT agreement.

In an example, AP 1002 may transmit a beacon frame 1008 including a TWT element that indicates an R-TWT SP 1020 of the setup R-TWT and TIDs allowed to be transmitted during the setup R-TWT. Beacon frame 1008 may also include a quiet element indicating a quiet interval 1022.

Upon receiving beacon frame 1008, STA 1004 may enter a doze state and may remain in the doze state until the start of R-TWT SP 1020. STA 1006, which is not scheduled by AP 1002 for R-TWT SP 1020, may transmit a data frame 1010 after receiving beacon frame 1008. However, STA 1006 must end its transmission before the start of R-TWT SP 1020. AP 1002 may transmit a BA frame 1012 in response to data frame 1010.

During R-TWT SP 1020, AP 1002 and STA 1004 may exchange an RTS frame 1014 and a CTS frame 1016. Subsequently, AP 1002 may send a data frame 1018 to STA 1004. Data frame 1018 includes traffic having a TID from among the TIDs indicated as permitted to transmit during R-TWT SP 1020 in beacon frame 1008. STA 1004 may respond with a BA frame 1024 to data frame 1018.

STA 1006 may not access the medium at least during quiet interval 1022 indicated in beacon frame 1008. When quiet interval 1022 or R-TWT SP 1020 ends, STA 1006 may resume transmission by transmitting a data frame 1026. STA 1004 may return to the doze state at the end of R-TWT SP 1020.

Figure 11:
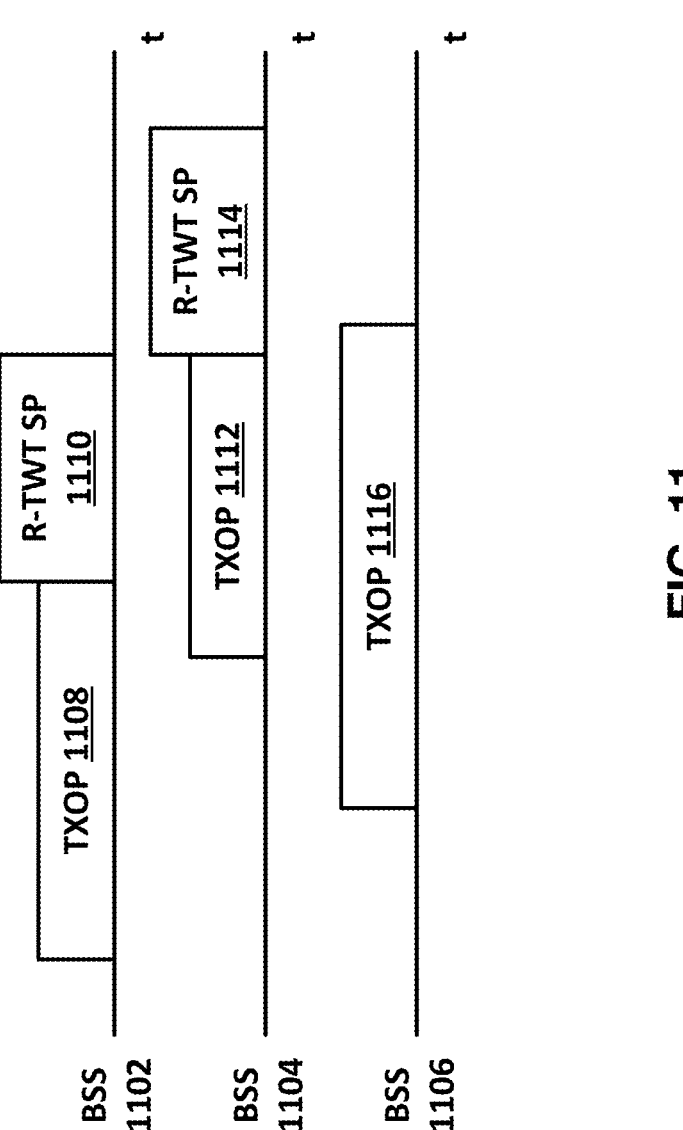
FIG. 11 is an example that illustrates inter-basic service set (BSS) interference due to overlap between a transmission opportunity (TXOP) of a BSS with R-TWT service periods (SPs) of overlapping BSSs.

FIG. 11 is an example 1100 that illustrates inter-basic service set (BSS) interference due to overlap between a transmission opportunity (TXOP) of a BSS with R-TWT service periods (SPs) of overlapping BSSs. As shown in FIG. 11, example 1100 includes three BSSs, BSS 1102, BSS 1102, and BSS 1106. BSSs 1102, 1104, and 1106 may be overlapping BSSs. That is, BSSs 1102, 1104, and 1106 may be neighboring BSSs that operate over the same channel and may as such cause interference to one another.

In example 1100, an R-TWT SP 1110 and an R-TWT SP 1114 may be scheduled in BSS 1102 and BSS 1104, respectively. Within BSS 1102, a TXOP 1108 initiated by an R-TWT supporting STA (not shown in FIG. 11) before R-TWT SP 1110 is ended by the R-TWT supporting STA before the start of R-TWT SP 1110 according to existing R-TWT operation as described above. Similarly, within BSS 1104, a TXOP 1112 initiated by an R-TWT supporting STA (not shown in FIG. 11) before R-TWT SP 1114 is ended by the R-TWT supporting STA before the start of R-TWT SP 1114.

However, according to existing R-TWT operation rules, an R-TWT supporting AP/STA in a given BSS is not required to end an initiated TXOP before the start time of an R-TWT SP scheduled in another BSS. As such, as shown in FIG. 11, TXOP 1112 within BSS 1104 may extend into R-TWT SP 1110 scheduled in BSS 1102. Similarly, TXOP 1116 within BSS 1106 may extend into R-TWT SP 1110 scheduled in BSS 1102 and/or R-TWT SP 1114 scheduled in BSS 1104. This may cause interference to and/or delayed transmission of R-TWT traffic (which may include latency sensitive traffic) within R-TWT SP 1110 and/or R-TWT SP 1114.

To enhance the delivery of latency sensitive traffic, coordinated medium access (CMA) has been proposed to allow APs of neighboring BSSs to coordinate their medium access. Two levels of coordination are envisioned. According to a first coordination level (level 1 CMA), an AP of a given BSS may end a TXOP that it initiates before the start of an SP scheduled in another BSS (called coordinated SP). To reduce contention from its associated STAs, the AP may set up trigger-enabled R-TWT SPs and/or use multi-user (MU) enhanced distributed channel access (EDCA) in the BSS. According to a second coordination level (level 2 CMA), the AP may announce the coordinated SP to its associated STAs and a STA may also end a TXOP that it initiates before the start of a coordinated SP scheduled in another BSS. In an implementation, the AP may announce the coordinated SP as an R-TWT SP and R-TWT supporting STAs associated with the AP may end an initiated TXOP before the start of the R-TWT SP.

Figure 12:
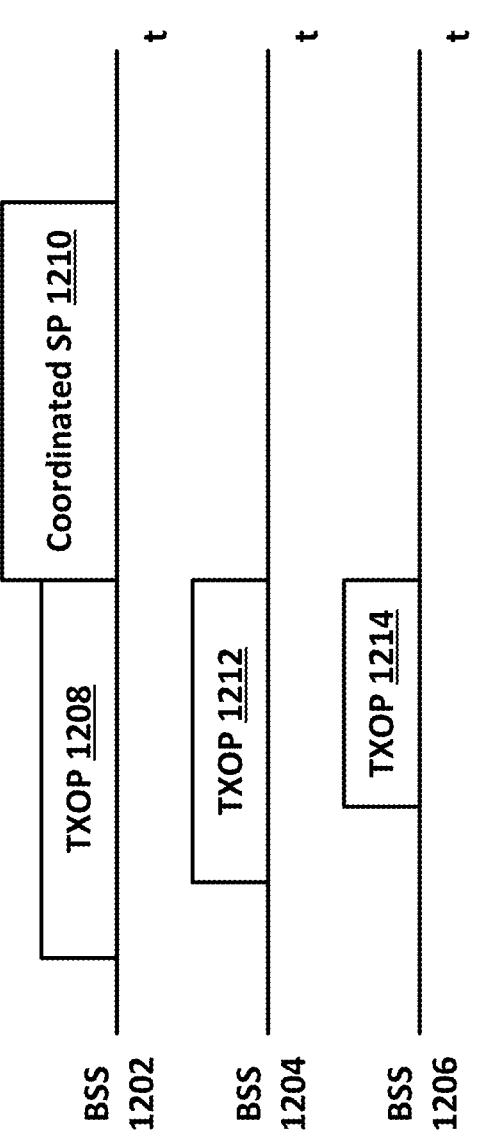
FIG. 12 is an example that illustrates the use of coordinated medium access (CMA) to reduce the inter-BSS interference illustrated in FIG. 12.

FIG. 12 is an example 1200 that illustrates the use of CMA to reduce the inter-BSS interference illustrated in FIG. 12. As shown in FIG. 12, example 1200 includes three BSSs, BSS 1202, BSS 1204, and BSS 1206. BSSs 1202, 1204, and 1206 may be overlapping BSSs.

In example 1200, an AP of BSS 1202 may schedule a coordinated SP 1210 in BSS 1102 and may announce coordinated SP 1210 in a beacon frame (not shown in FIG. 12) transmitted prior to the start of coordinated SP 1210. APs of BSSs 1204 and 1206 may receive the beacon frame and may announce coordinated SP 1210 to their respective associated STAs. In BSS 1202, the AP or an R-TWT supporting STA may end a TXOP 1208 before the start of SP 1210. In BSSs 1204 and 1206, TXOPs 1212 and 1214 respectively may also be ended before the start of coordinated SP 1210. TXOPs 1212 and 1214 may be ended by initiating APs only when level 1 CMA is used and by both initiating APs and initiating STAs when level 2 CMA is used.

As described above, one requirement for proper CMA operation is that an AP of a given BSS successfully receives the beacon frame transmitted by another AP of another BSS, in order for the AP to learn of the scheduling of a coordinated SP in the other BSS. The AP however may incur interference at the time of transmission of the beacon frame of the other AP and thus may not be able to receive the beacon frame transmitted by the other AP. For example, a STA associated with the AP may transmit a frame to the AP at the time of transmission of the beacon frame by the other AP resulting in failure of the AP to receive the beacon frame of the other AP. Embodiments of the present disclosure, as further described below, address this potential problem that may arise in a BSS and that may preclude CMA among overlapping BSSs.

Figure 13:
FIG. 13 is an example that illustrates a multi-AP coordination procedure according to an embodiment of the present disclosure.

FIG. 13 is an example 1300 that illustrates a multi-AP coordination procedure according to an embodiment of the present disclosure. As shown in FIG. 13, example 1300 includes APs 1302 and 1304 and a STA 1306. APs 1302 and 1304 may be within communication range of one another. For example, APs 1302 and 1304 may be overlapping basis service set (OBSS) APs relative to one another. APs 1302 and 1304 may or may not be part of a multi-AP group. STA 1306 may be associated with AP 1304. AP 1302 and STA 1306 may or may not be within communication range of one another. AP 1302, AP 1304, and/or STA 1306 may support CMA. In an embodiment, supporting CMA comprises AP 1302, AP 1304, and/or STA 1306 ending a TXOP before a start time of an R-TWT SP of an OBSS AP.

As shown in FIG. 13, example 1300 may begin with AP 1302 transmitting a beacon frame 1310 at a TBTT 1308 of AP 1302, after performing a random backoff. Beacon frame 1310 may comprise first R-TWT information of AP 1302. The first R-TWT information of AP 1302 may comprise information regarding one or more R-TWT SPs currently scheduled by AP 1302. For example, as shown in FIG. 13, AP 1302 may have scheduled an R-TWT SP 1326. The first R-TWT information may comprise information regarding R-TWT SP 1326. The information regarding R-TWT SP 1326 may include a start time and a duration of R-TWT SP 1326, for example.

In example 1300, due to interference, AP 1304 may not successfully receive beacon frame 1310 from AP 1302. In an embodiment, based on not receiving beacon frame 1310 within a first period from TBTT 1308, AP 1304 may transmit to AP 1302 a first frame 1312 requesting the first R-TWT information of AP 1302. In an embodiment, the first period is larger than a transmission duration of a beacon frame of AP 1302. First frame 1312 may comprise a request frame. First frame 1312 may be a management frame, a control frame, or an action frame.

In an embodiment, AP 1302 may transmit a second frame 1314 in response to first frame 1312. Second frame 1314 may comprise a response frame. Second frame 1314 may be a management frame, a control frame, an action frame, or an immediate response frame. Second frame 1314 may comprise the first R-TWT information. For example, the first R-TWT information may comprise information regarding R-TWT SP 1326 scheduled by AP 1302. The information regarding R-TWT SP 1326 may include a start time and a duration of R-TWT SP 1326, for example.

In an embodiment, AP 1304 may apply the first R-TWT information for a current beacon interval of AP 1302 (e.g., the current beacon interval of AP 1302 is a time interval that starts at TBTT 1308 and ends with a next TBTT of AP 1302). In an example, AP 1304 may transmit a beacon frame 1316. In an embodiment, AP 1304 may include information regarding R-TWT SP 1326 of AP 1302 in beacon frame 1316. Additionally, AP 1304 may include information regarding an R-TWT SP 1328 being scheduled by AP 1304. In an example, R-TWT SP 1328 may fall within the current beacon interval of AP 1302. In an embodiment, AP 1304 may schedule R-TWT SP 1328 so as not to overlap with R-TWT SP 1326 of AP 1302.

In another example, AP 1304 may transmit a third frame 1318 initiating a TXOP 1330. Third frame 1318 may comprise an RTS frame. Third frame 1318 may comprise a data frame. In an embodiment, TXOP 1330 may be configured so as not to overlap with R-TWT SP 1326 of AP 1302. For example, as shown in FIG. 13, AP 1304 may configure TXOP 1330 to end before the start time of R-TWT SP 1326. STA 1306 may transmit to AP 1304 a fourth frame 1320 in response to third frame 1318. Fourth frame 1320 may comprise a CTS frame. In another embodiment, fourth frame 1320 may comprise a BlockAck (BA) frame in response to third frame 1318 comprising a data frame. Subsequently, AP 1304 may transmit a data frame 1322 to STA 1306 and STA 1306 may acknowledge data frame 1322 by transmitting a BA frame 1324 to AP 1304, both within TXOP 1330.

Figure 14:
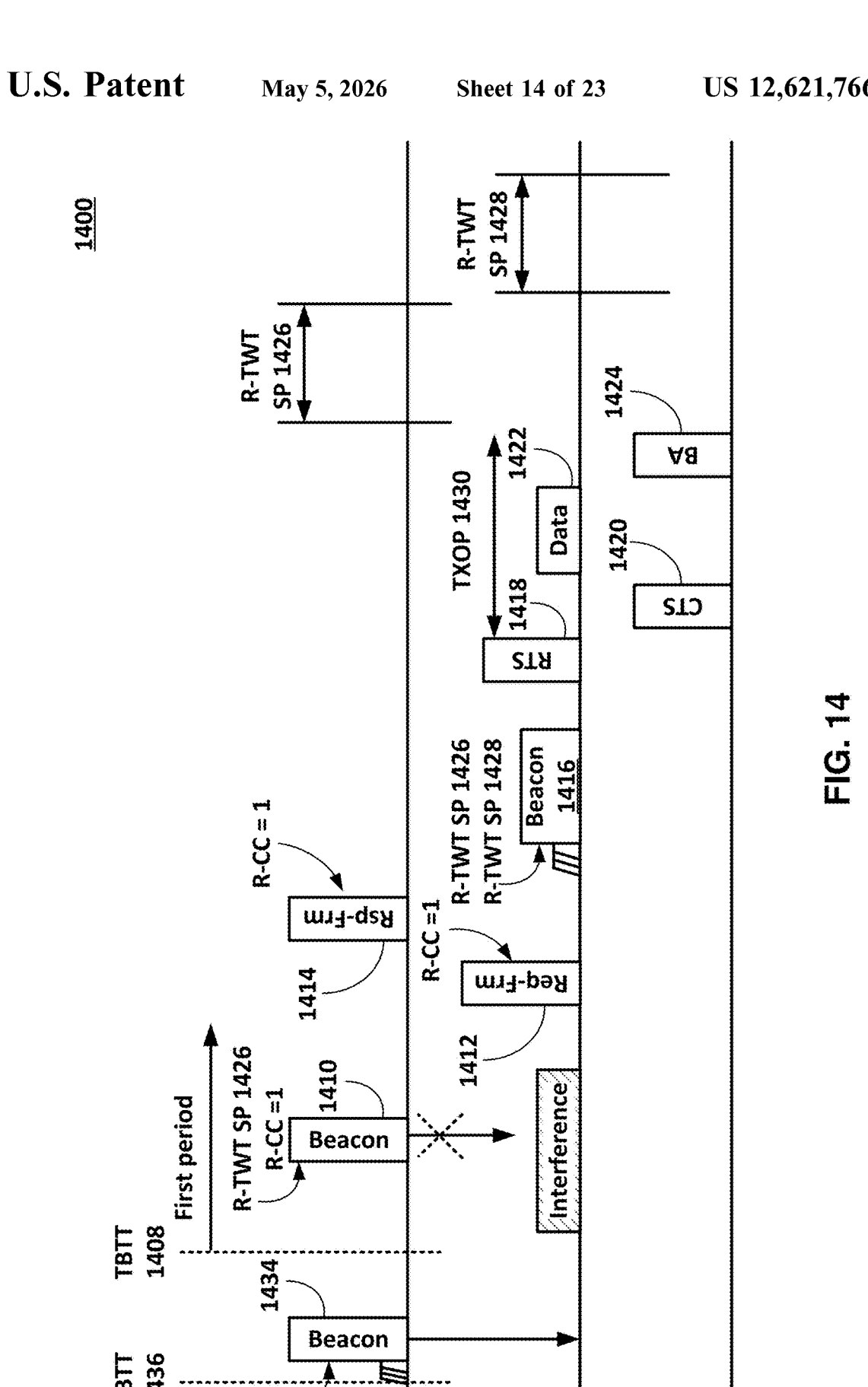
FIG. 14 is an example that illustrates another multi-AP coordination procedure according to an embodiment of the present disclosure.

FIG. 14 is an example 1400 that illustrates another multi-AP coordination procedure according to an embodiment of the present disclosure. As shown in FIG. 14, example 1400 includes APs 1402 and 1404 and a STA 1406. APs 1402 and 1404 may be within communication range of one another. For example, APs 1402 and 1404 may be OBSS APS relative to one another. APs 1402 and 1404 may or may not be part of a multi-AP group. STA 1406 may be associated with AP 1404. AP 1402 and STA 1406 may or may not be within communication range of one another. AP 1402, AP 1404, and/or STA 1406 may support CMA. In an embodiment, supporting CMA comprises AP 1402, AP 1404, and/or STA 1406 ending a TXOP before a start time of an R-TWT SP of an OBSS AP.

As shown in FIG. 14, example 1400 may begin with AP 1402 transmitting a beacon frame 1434 at a TBTT 1436 of AP 1402, after performing a random backoff. Beacon frame 1434 may comprise second R-TWT information of AP 1402. The second R-TWT information of AP 1402 may comprise information regarding one or more R-TWT SPs currently scheduled by AP 1402. For example, as shown in FIG. 14, AP 1402 may have scheduled an R-TWT SP 1426. The second R-TWT information may comprise information regarding R-TWT SP 1426. The information regarding R-TWT SP 1426 may include a start time and a duration of R-TWT SP 1426, for example.

In an embodiment, beacon frame 1434 may further comprise a first R-TWT change count of AP 1402. As used herein, an R-TWT change count is an unsigned integer that indicates a state of scheduled R-TWT SP(s) of an AP. In an example, the AP may initialize the R-TWT change count to 0 for an initial state of scheduled R-TWT SP(s) of the AP. The AP may increment the R-TWT change count to 1 when the initial state of scheduled R-TWT SP(s) changes to a different state of R-TWT SP(s), and so on. In example 1400, the first R-TWT change count is equal to 1 indicating a state of scheduled R-TWT SP(s) reflected by the second R-TWT information.

In an embodiment, AP 1404 may store the second R-TWT information and/or the first R-TWT change count of AP 1402 on receiving beacon frame 1434.

Subsequently, AP 1402 may transmit a beacon frame 1410 at a TBTT 1408 of AP 1402, after performing a random backoff. Beacon frame 1410 may include first R-TWT information of AP 1402 and/or a second R-TWT change count. The first R-TWT information of AP 1402 may comprise information regarding one or more R-TWT SPs currently scheduled by AP 1402. In an embodiment, AP 1402 may include the first R-TWT information in beacon frame 1410 even when the first R-TWT information is identical to the second R-TWT information included in beacon frame 1434. In another embodiment, AP 1402 may not include the first R-TWT information in beacon frame 1410 when the first R-TWT information is identical to the second R-TWT information included in beacon frame 1434. Instead, AP 1402 may include the second R-TWT change count only in beacon frame 1410, with the second R-TWT change count being equal to the first R-TWT change count indicated in beacon frame 1434. In example 1400, the first R-TWT information may be identical to the second R-TWT information. The second R-TWT change count may be equal to the first R-TWT change count.

In example 1400, due to interference, AP 1404 may not successfully receive beacon frame 1410 from AP 1402. In an embodiment, based on not receiving beacon frame 1410 within a first period from TBTT 1408, AP 1404 may transmit to AP 1402 a first frame 1412 requesting the first R-TWT information of AP 1402. In an embodiment, the first period is larger than a transmission duration of a beacon frame of AP 1402. First frame 1412 may comprise a request frame. First frame 1412 may be a management frame, a control frame, or an action frame. In an embodiment, AP 1404 may include in first frame 1412 the first R-TWT change count received in beacon frame 1434 and stored by AP 1404.

In an embodiment, AP 1402 may transmit a second frame 1414 in response to first frame 1412. Second frame 1414 may comprise a response frame. Second frame 1414 may be a management frame, a control frame, an action frame, or an immediate response frame. In an embodiment, second frame 1414 may comprise the first R-TWT information and/or the second R-TWT change count of AP 1402. In example 1400, as the state of R-TWT SP(s) at AP 1402 did not change relative to the state indicated by the first R-TWT change count included in first frame 1412, AP 1402 may include the second R-TWT change count only in second frame 1414, with the second R-TWT change count being equal to the first R-TWT change count. As such, AP 1402 may not include R-TWT information in second frame 1414, which reduces the signaling overhead of second frame 1414.

In an embodiment, AP 1404 may store the first R-TWT information and/or the second R-TWT change count of AP 1402 on receiving second frame 1414.

In an embodiment, AP 1404 may apply the first R-TWT information for a current beacon interval of AP 1402 (e.g., the current beacon interval of AP 1402 is a time interval that starts at TBTT 1408 and ends with a next TBTT of AP 1402). In an example, AP 1404 may transmit a beacon frame 1416. In an embodiment, AP 1404 may include information regarding R-TWT SP 1426 of AP 1402 in beacon frame 1416. Additionally, AP 1404 may include information regarding an R-TWT SP 1428 being scheduled by AP 1404. In an example, R-TWT SP 1428 may fall within the current beacon interval of AP 1402. In an embodiment, AP 1404 may schedule R-TWT SP 1428 so as not to overlap with R-TWT SP 1426 of AP 1402.

In another example, AP 1404 may transmit a third frame 1418 initiating a TXOP 1430. Third frame 1418 may comprise an RTS frame. In another embodiment, third frame 1418 may comprise a data frame. In an embodiment, TXOP 1430 may be configured so as not to overlap with R-TWT SP 1426 of AP 1402. For example, as shown in FIG. 14, AP 1404 may configure TXOP 1430 to end before the start time of R-TWT SP 1426. STA 1406 may transmit to AP 1404 a fourth frame 1420 in response to third frame 1418. Fourth frame 1420 may comprise a CTS frame. In another embodiment, fourth frame 1420 may comprise a BA frame in response to third frame 1418 comprising a data frame. Subsequently, AP 1404 may transmit a data frame 1422 to STA 1406 and STA 1406 may acknowledge data frame 1422 by transmitting a BA frame 1424 to AP 1404, both within TXOP 1430.

Figure 15:
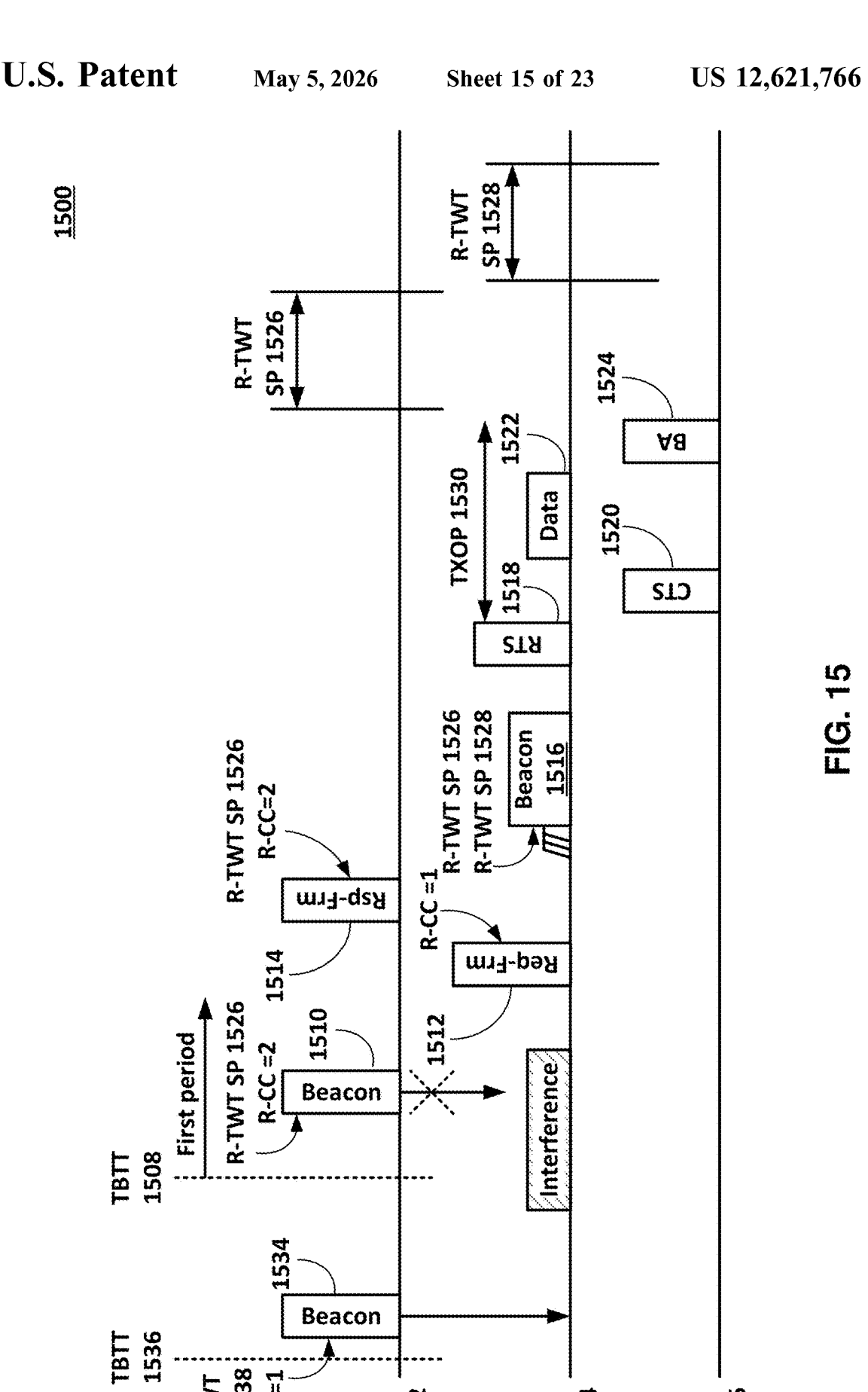
FIG. 15 is an example that illustrates another multi-AP coordination procedure according to an embodiment of the present disclosure.

FIG. 15 is an example 1500 that illustrates another multi-AP coordination procedure according to an embodiment of the present disclosure. As shown in FIG. 15, example 1500 includes APs 1502 and 1504 and a STA 1506. APs 1502 and 1504 may be within communication range of one another. For example, APs 1502 and 1504 may be OBSS APS relative to one another. APs 1502 and 1504 may or may not be part of a multi-AP group. STA 1506 may be associated with AP 1504. AP 1502 and STA 1506 may or may not be within communication range of one another. AP 1502, AP 1504, and/or STA 1506 may support CMA. In an embodiment, supporting CMA comprises AP 1502, AP 1504, and/or STA 1506 ending a TXOP before a start time of an R-TWT SP of an OBSS AP.

As shown in FIG. 15, example 1500 may begin with AP 1502 transmitting a beacon frame 1534 at a TBTT 1536 of AP 1502, after performing a random backoff. Beacon frame 1534 may comprise second R-TWT information of AP 1502. The second R-TWT information of AP 1502 may comprise information regarding one or more R-TWT SPs currently scheduled by AP 1502. For example, as shown in FIG. 15, the second R-TWT information may comprise information regarding an R-TWT SP 1538 (not shown in FIG. 15). The information regarding R-TWT SP 1538 may include a start time and a duration of R-TWT SP 1538, for example.

In an embodiment, beacon frame 1534 may further comprise a first R-TWT change count of AP 1502. In example 1500, the first R-TWT change count is equal to 1 indicating a state of scheduled R-TWT SP(s) reflected by the second R-TWT information.

In an embodiment, AP 1504 may store the second R-TWT information and/or the first R-TWT change count of AP 1502 on receiving beacon frame 1534.

Subsequently, AP 1502 may transmit a beacon frame 1510 at a TBTT 1508 of AP 1502, after performing a random backoff. Beacon frame 1510 may include first R-TWT information of AP 1502 and/or a second R-TWT change count. The first R-TWT information of AP 1502 may comprise information regarding one or more R-TWT SPs currently scheduled by AP 1502. In an embodiment, AP 1502 may include the first R-TWT information in beacon frame 1510 even when the first R-TWT information is identical to the second R-TWT information included in beacon frame 1534. In another embodiment, AP 1502 may not include the first R-TWT information in beacon frame 1510 when the first R-TWT information is identical to the second R-TWT information included in beacon frame 1534. Instead, AP 1502 may include the second R-TWT change count only in beacon frame 1510, with the second R-TWT change count being equal to the first R-TWT change count indicated in beacon frame 1534. In example 1500, the first R-TWT information may be different than the second R-TWT information. For example, the first R-TWT information may include information regarding an R-TWT SP 1526 scheduled by AP 1502 (instead of information regarding R-TWT SP 1538). The second R-TWT change count may be equal to the first R-TWT change count plus 1, indicating a state of scheduled R-TWT SP(s) of AP 1502 reflected by the first R-TWT information.

In example 1500, due to interference, AP 1504 may not successfully receive beacon frame 1510 from AP 1502. In an embodiment, based on not receiving beacon frame 1510 within a first period from TBTT 1508, AP 1504 may transmit to AP 1502 a first frame 1512 requesting the first R-TWT information of AP 1502. In an embodiment, the first period is larger than a transmission duration of a beacon frame of AP 1502. First frame 1512 may comprise a request frame. First frame 1512 may be a management frame, a control frame, or an action frame. In an embodiment, AP 1504 may include in first frame 1512 the first R-TWT change count received in beacon frame 1534 and stored by AP 1504.

In an embodiment, AP 1502 may transmit a second frame 1514 in response to first frame 1512. Second frame 1514 may comprise a response frame. Second frame 1514 may be a management frame, a control frame, an action frame, or an immediate response frame. In an embodiment, second frame 1514 may comprise the first R-TWT information and/or the second R-TWT change count of AP 1502. In example 1500, as the state of R-TWT SP(s) at AP 1502 changed relative to the state indicated by the first R-TWT change count included in first frame 1512, AP 1502 may include both the second R-TWT change count and the first R-TWT information in second frame 1514.

In an embodiment, AP 1504 may store the first R-TWT information and/or the second R-TWT change count of AP 1502 on receiving second frame 1514.

In an embodiment, AP 1504 may apply the first R-TWT information for a current beacon interval of AP 1502 (e.g., the current beacon interval of AP 1502 is a time interval that starts at TBTT 1508 and ends with a next TBTT of AP 1502). In an example, AP 1504 may transmit a beacon frame 1516. In an embodiment, AP 1504 may include information regarding R-TWT SP 1526 of AP 1502 in beacon frame 1516. Additionally, AP 1504 may include information regarding an R-TWT SP 1528 being scheduled by AP 1504. In an example, R-TWT SP 1428 may fall within the current beacon interval of AP 1402. In an embodiment, AP 1504 may schedule R-TWT SP 1528 so as not to overlap with R-TWT SP 1526 of AP 1502. In an example, R-TWT SP 1428 may fall within the current beacon interval of AP 1402.

In another example, AP 1504 may transmit a third frame 1518 initiating a TXOP 1530. Third frame 1518 may comprise an RTS frame. In another embodiment, third frame 1518 may comprise a data frame. In an embodiment, TXOP 1530 may be configured so as not to overlap with R-TWT SP 1526 of AP 1502. For example, as shown in FIG. 15, AP 1504 may configure TXOP 1530 to end before the start time of R-TWT SP 1526. STA 1506 may transmit to AP 1504 a fourth frame 1520 in response to third frame 1518. Fourth frame 1520 may comprise a CTS frame. In another embodiment, fourth frame 1520 may comprise a BA frame in response to third frame 1518 comprising a data frame. Subsequently, AP 1504 may transmit a data frame 1522 to STA 1506 and STA 1506 may acknowledge data frame 1522 by transmitting a BA frame 1524 to AP 1504, both within TXOP 1530.

Figure 16:
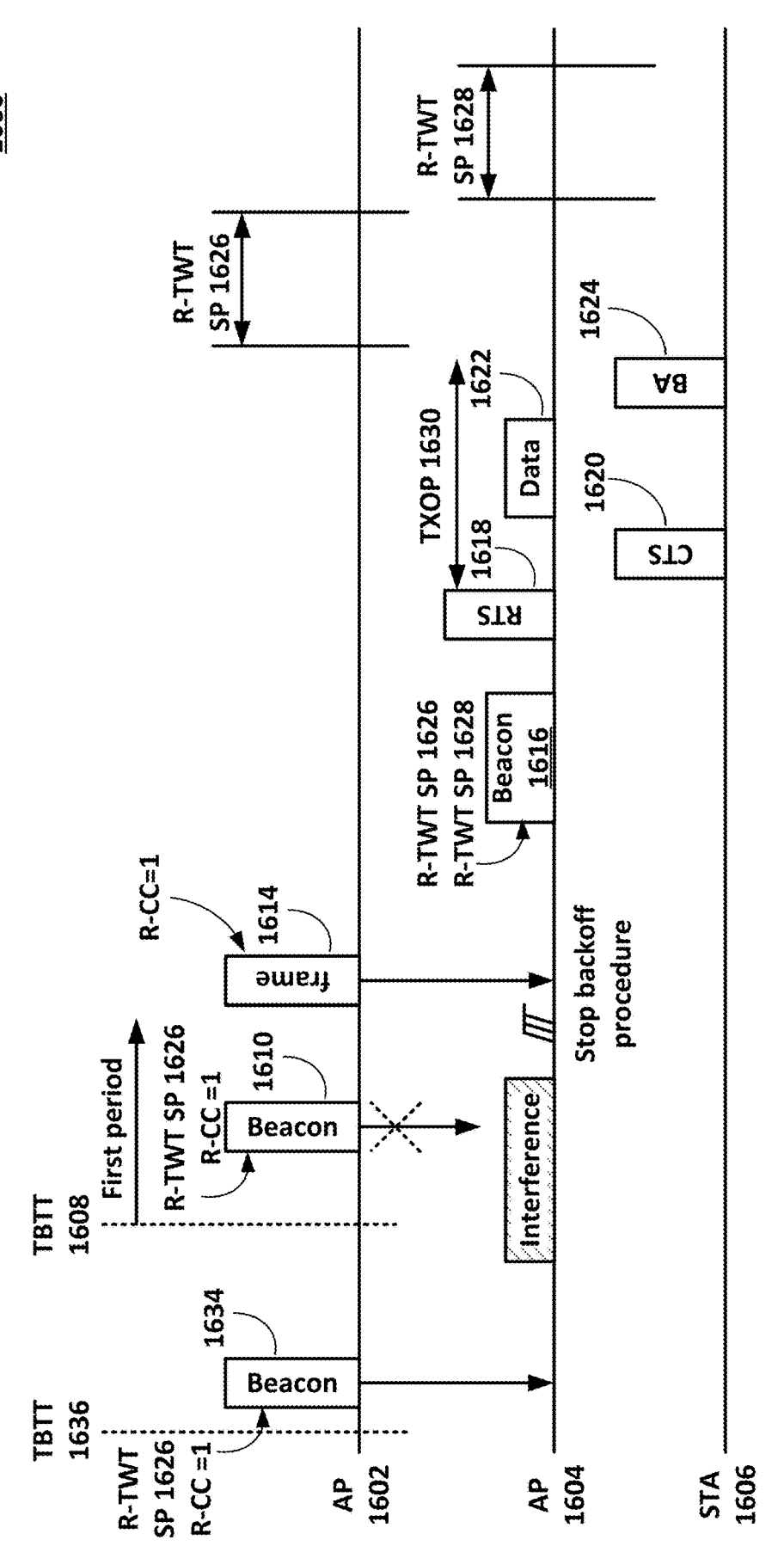
FIG. 16 is an example that illustrates another multi-AP coordination procedure according to an embodiment of the present disclosure.

FIG. 16 is an example 1600 that illustrates another multi-AP coordination procedure according to an embodiment of the present disclosure. As shown in FIG. 16, example 1600 includes APs 1602 and 1604 and a STA 1606. APs 1602 and 1604 may be within communication range of one another. For example, APs 1602 and 1604 may be OBSS APS relative to one another. APs 1602 and 1604 may or may not be part of a multi-AP group. STA 1606 may be associated with AP 1604. AP 1602 and STA 1606 may or may not be within communication range of one another. AP 1602, AP 1604, and/or STA 1606 may support CMA. In an embodiment, supporting CMA comprises AP 1602, AP 1604, and/or STA 1606 ending a TXOP before a start time of an R-TWT SP of an OBSS AP.

As shown in FIG. 16, example 1600 may begin with AP 1602 transmitting a beacon frame 1634 at a TBTT 1636 of AP 1602, after performing a random backoff. Beacon frame 1634 may comprise second R-TWT information of AP 1602. The second R-TWT information of AP 1602 may comprise information regarding one or more R-TWT SPs currently scheduled by AP 1602. For example, as shown in FIG. 16, AP 1602 may have scheduled an R-TWT SP 1626. The second R-TWT information may comprise information regarding R-TWT SP 1626. The information regarding R-TWT SP 1626 may include a start time and a duration of R-TWT SP 1626, for example.

In an embodiment, beacon frame 1634 may further comprise a first R-TWT change count of AP 1602. In example 1600, the first R-TWT change count is equal to 1 indicating a state of scheduled R-TWT SP(s) reflected by the second R-TWT information.

In an embodiment, AP 1604 may store the second R-TWT information and/or the first R-TWT change count of AP 1602 on receiving beacon frame 1634.

Subsequently, AP 1602 may transmit a beacon frame 1610 at a TBTT 1608 of AP 1602, after performing a random backoff. Beacon frame 1610 may include first R-TWT information of AP 1602 and/or a second R-TWT change count. The first R-TWT information of AP 1602 may comprise information regarding one or more R-TWT SPs currently scheduled by AP 1602. In an embodiment, AP 1602 may include the first R-TWT information in beacon frame 1610 even when the first R-TWT information is identical to the second R-TWT information included in beacon frame 1634. In another embodiment, AP 1602 may not include the first R-TWT information in beacon frame 1610 when the first R-TWT information is identical to the second R-TWT information included in beacon frame 1634. Instead, AP 1602 may include the second R-TWT change count only in beacon frame 1610, with the second R-TWT change count being equal to the first R-TWT change count indicated in beacon frame 1634. In example 1600, the first R-TWT information may be identical to the second R-TWT information. The second R-TWT change count may be equal to the first R-TWT change count.

In example 1600, due to interference, AP 1604 may not successfully receive beacon frame 1610 from AP 1602. In an embodiment, based on not receiving beacon frame 1610 within a first period from TBTT 1608, AP 1604 may initiate a backoff procedure to transmit to AP 1602 a first frame (not shown in FIG. 16) requesting the first R-TWT information of AP 1602. In an embodiment, the first period is larger than a transmission duration of a beacon frame of AP 1602. The first frame may comprise a request frame. The first frame may be a management frame, a control frame, or an action frame. In an embodiment, AP 1604 may include in the first frame the first R-TWT change count received in beacon frame 1634 and stored by AP 1604.

In an embodiment, AP 1602 may be configured to transmit a second frame 1614 comprising the second R-TWT change count of AP 1602 a pre-determined time period after transmitting beacon frame 1610. In an embodiment, the pre-determined time period may be configured such that AP 1602 transmits second frame 1614 before AP 1604 completes the backoff procedure to transmit the first frame. That is, the pre-determined time period may be configured such that AP 1604 receives second frame 1614 before AP 1604 starts transmitting the first frame.

In an embodiment, based on the second R-TWT change count indicated in second frame 1614 being equal to the first R-TWT change count received in beacon frame 1634 and stored by AP 1604, AP 1604 may be configured to stop the backoff procedure to transmit the first frame. That is, AP 1604 may stop the backoff procedure based on determining that the state of scheduled R-TWT SP(s) at AP 1604 has not changed since AP 1604 received beacon frame 1634.

In an embodiment, AP 1604 may apply the first R-TWT information for a current beacon interval of AP 1602 (e.g., the current beacon interval of AP 1602 is a time interval that starts at TBTT 1608 and ends with a next TBTT of AP 1602). In an example, AP 1604 may transmit a beacon frame 1616.

In an embodiment, AP 1604 may include information regarding R-TWT SP 1626 of AP 1602 in beacon frame 1616. Additionally, AP 1604 may include information regarding an R-TWT SP 1628 being scheduled by AP 1604. In an example, R-TWT SP 1628 may fall within the current beacon interval of AP 1602. In an embodiment, AP 1604 may schedule R-TWT SP 1628 so as not to overlap with R-TWT SP 1626 of AP 1602.

In another example, AP 1604 may transmit a third frame 1618 initiating a TXOP 1630. Third frame 1618 may comprise an RTS frame. In another embodiment, third frame 1618 may comprise a data frame. In an embodiment, TXOP 1630 may be configured so as not to overlap with R-TWT SP 1626 of AP 1602. For example, as shown in FIG. 16, AP 1604 may configure TXOP 1630 to end before the start time of R-TWT SP 1626. STA 1606 may transmit to AP 1604 a fourth frame 1620 in response to third frame 1618. Fourth frame 1620 may comprise a CTS frame. In another embodiment, fourth frame 1620 may comprise a BA frame in response to third frame 1618 comprising a data frame. Subsequently, AP 1604 may transmit a data frame 1622 to STA 1606 and STA 1606 may acknowledge data frame 1622 by transmitting a BA frame 1624 to AP 1604, both within TXOP 1630.

Figure 17:
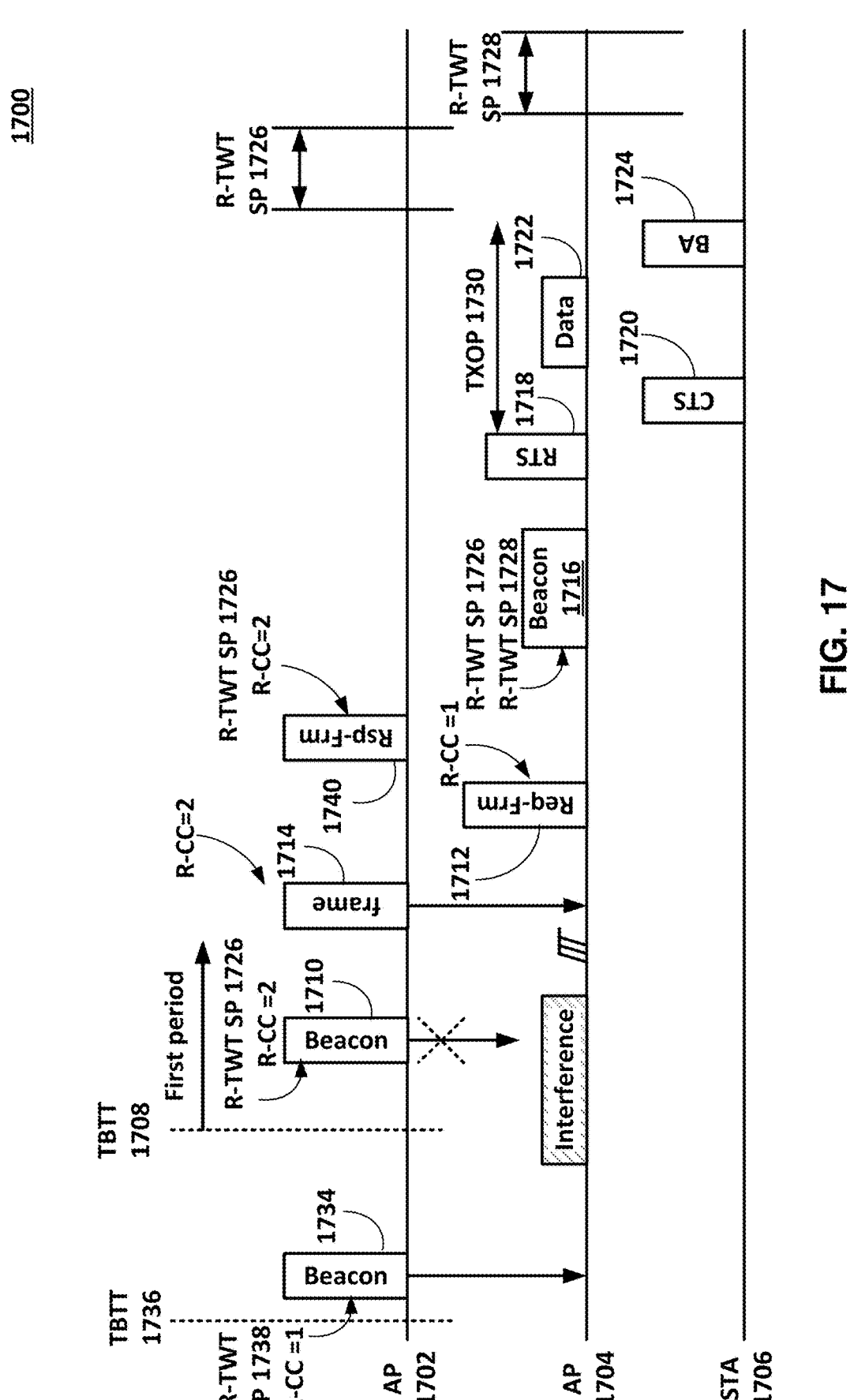
FIG. 17 is an example that illustrates another multi-AP coordination procedure according to an embodiment of the present disclosure.

FIG. 17 is an example 1700 that illustrates another multi-AP coordination procedure according to an embodiment of the present disclosure. As shown in FIG. 17, example 1700 includes APs 1702 and 1704 and a STA 1706. APs 1702 and 1704 may be within communication range of one another. For example, APs 1702 and 1704 may be OBSS APS relative to one another. APs 1702 and 1704 may or may not be part of a multi-AP group. STA 1706 may be associated with AP 1704. AP 1702 and STA 1706 may or may not be within communication range of one another. AP 1702, AP 1704, and/or STA 1706 may support CMA. In an embodiment, supporting CMA comprises AP 1702, AP 1704, and/or STA 1706 ending a TXOP before a start time of an R-TWT SP of an OBSS AP.

As shown in FIG. 17, example 1700 may begin with AP 1702 transmitting a beacon frame 1734 at a TBTT 1736 of AP 1702, after performing a random backoff. Beacon frame 1734 may comprise second R-TWT information of AP 1702. The second R-TWT information of AP 1702 may comprise information regarding one or more R-TWT SPs currently scheduled by AP 1702. For example, as shown in FIG. 17, AP 1702 may have scheduled an R-TWT SP 1738 (not shown in FIG. 17). The information regarding R-TWT SP 1738 may include a start time and a duration of R-TWT SP 1738, for example.

In an embodiment, beacon frame 1734 may further comprise a first R-TWT change count of AP 1702. In example 1700, the first R-TWT change count is equal to 1 indicating a state of scheduled R-TWT SP(s) reflected by the second R-TWT information.

In an embodiment, AP 1704 may store the second R-TWT information and/or the first R-TWT change count of AP 1702 on receiving beacon frame 1734.

Subsequently, AP 1702 may transmit a beacon frame 1710 at a TBTT 1708 of AP 1702, after performing a random backoff. Beacon frame 1710 may include first R-TWT information of AP 1702 and/or a second R-TWT change count. The first R-TWT information of AP 1702 may comprise information regarding one or more R-TWT SPs currently scheduled by AP 1702. In an embodiment, AP 1702 may include the first R-TWT information in beacon frame 1710 even when the first R-TWT information is identical to the second R-TWT information included in beacon frame 1734. In another embodiment, AP 1702 may not include the first R-TWT information in beacon frame 1710 when the first R-TWT information is identical to the second R-TWT information included in beacon frame 1734. Instead, AP 1702 may include the second R-TWT change count only in beacon frame 1710, with the second R-TWT change count being equal to the first R-TWT change count indicated in beacon frame 1734. In example 1700, the first R-TWT information may be different than the second R-TWT information. For example, the first R-TWT information may include information regarding an R-TWT SP 1726 scheduled by AP 1502 (instead of information regarding R-TWT SP 1738). The second R-TWT change count may be equal to the first R-TWT change count plus 1, indicating a state of scheduled R-TWT SP(s) of AP 1702 reflected by the first R-TWT information.

In example 1700, due to interference, AP 1704 may not successfully receive beacon frame 1710 from AP 1702. In an embodiment, based on not receiving beacon frame 1710 within a first period from TBTT 1708, AP 1704 may initiate a backoff procedure to transmit to AP 1702 a first frame 1712 requesting the first R-TWT information of AP 1702. In an embodiment, the first period is larger than a transmission duration of a beacon frame of AP 1702. The first frame may comprise a request frame. The first frame may be a management frame, a control frame, or an action frame. In an embodiment, AP 1704 may include in the first frame the first R-TWT change count received in beacon frame 1734 and stored by AP 1704.

In an embodiment, AP 1702 may be configured to transmit a second frame 1714 comprising the second R-TWT change count of AP 1702 a pre-determined time period after transmitting beacon frame 1710. In an embodiment, the pre-determined time period may be configured such that AP 1702 transmits second frame 1714 before AP 1704 completes the backoff procedure to transmit first frame 1712. That is, the pre-determined time period may be configured such that AP 1704 receives second frame 1714 before AP 1704 starts transmitting first frame 1712.

In an embodiment, based on the second R-TWT change count indicated in second frame 1714 being different than (e.g., greater than) the first R-TWT change count received in beacon frame 1734 and stored by AP 1704, AP 1704 may be configured to continue the backoff procedure to transmit first frame 1712. That is, AP 1704 may continue the backoff procedure to transmit first frame 1712 based on determining that the state of scheduled R-TWT SP(s) at AP 1704 has changed since AP 1704 received beacon frame 1734.

Subsequently, AP 1704 may transmit first frame 1712. First frame 1712 may comprise the first R-TWT change count. In an embodiment, AP 1702 may transmit a third frame 1740 in response to first frame 1712. Third frame 1740 may comprise a response frame. Third frame 1740 may be a management frame, a control frame, an action frame, or an immediate response frame. In an embodiment, third frame 1740 may comprise the first R-TWT information and/or the second R-TWT change count of AP 1702. In example 1700, based on first frame 1712 indicating the first R-TWT change count, AP 1702 may include both the second R-TWT change count and the first R-TWT information in third frame 1740. In another embodiment, AP 1702 may include only update information between the second R-TWT information and the first R-TWT information.

In an embodiment, AP 1704 may apply the first R-TWT information for a current beacon interval of AP 1702 (e.g., the current beacon interval of AP 1702 is a time interval that starts at TBTT 1708 and ends with a next TBTT of AP 1702).

In an example, AP 1704 may transmit a beacon frame 1716. In an embodiment, AP 1704 may include information regarding R-TWT SP 1726 of AP 1702 in beacon frame 1716. Additionally, AP 1704 may include information regarding an R-TWT SP 1728 being scheduled by AP 1704. In an example, R-TWT SP 1728 may fall within the current beacon interval of AP 1702. In an embodiment, AP 1704 may schedule R-TWT SP 1728 so as not to overlap with R-TWT SP 1726 of AP 1702.

In another example, AP 1704 may transmit a fourth frame 1718 initiating a TXOP 1730. Fourth frame 1718 may comprise an RTS frame. In another embodiment, fourth frame 1718 may comprise a data frame. In an embodiment, TXOP 1730 may be configured so as not to overlap with R-TWT SP 1726 of AP 1702. For example, as shown in FIG. 17, AP 1704 may configure TXOP 1730 to end before the start time of R-TWT SP 1726. STA 1706 may transmit to AP 1704 a fifth frame 1720 in response to fourth frame 1718. Fifth frame 1720 may comprise a CTS frame. In another embodiment, fifth frame 1720 may comprise a BA frame in response to fourth frame 1718 comprising a data frame. Subsequently, AP 1704 may transmit a data frame 1722 to STA 1706 and STA 1706 may acknowledge data frame 1722 by transmitting a BA frame 1724 to AP 1704, both within TXOP 1730.

FIG. 18 illustrates an example process 1800 according to an embodiment. Example process 1800 may be performed by a first AP, such as AP 1304, 1404, 1504, 1604, or 1704. As shown in FIG. 18, process 1800 includes steps 1802 and 1804.

Step 1802 includes transmitting, by the first AP to a second AP, a first frame requesting first R-TWT information of the second AP based on not receiving a beacon frame of the second AP within a first period from a TBTT of the second AP. The second AP may be an OBSS AP relative to the first AP. The first AP and the second AP may or may not be part of a multi-AP group. In an embodiment, the first AP and the second AP support CMA.

In an embodiment, the first frame comprises a management frame, a control frame, or an action frame. In an embodiment, the first frame comprises a request frame, and the second frame comprises a response frame.

In an embodiment, the first period is larger than a transmission duration of a beacon frame of the second AP.

In an embodiment, the first R-TWT information comprises information regarding one or more R-TWT SPs.

Step 1804 includes receiving, by the first AP from the second AP, a second frame comprising the first R-TWT information of the second AP in response to the first frame. In an embodiment, the second frame comprises a management frame, a control frame, an action frame, or an immediate response frame.

In an embodiment, process 1800 may further comprise receiving, by the first AP from the second AP, a third frame comprising second R-TWT information of the second AP and a first R-TWT change count of the second AP. In an embodiment, process 1800 may further comprise storing, by the first AP, the second R-TWT information and the first R-TWT change count. In an embodiment, the third frame comprises a beacon frame or a probe response frame.

In an embodiment, the first frame further comprises the first R-TWT change count.

In an embodiment, the second frame further comprises a second R-TWT change count of the second AP. The second R-TWT change count may be equal or different than the first R-TWT change count.

In an embodiment, process 1800 may further comprise maintaining, by the first AP, the first R-TWT information and the second R-TWT change count.

In an embodiment, process 1800 may further comprise transmitting, by the first AP to a STA, a fourth frame comprising a first R-TWT SP of the first AP. The STA may be associated with the first AP. In an embodiment, the first R-TWT SP of the first AP does not overlap with a second R-TWT SP of the second AP indicated in the first R-TWT information. In an embodiment, the first R-TWT SP of the first AP does not overlap with a second R-TWT SP of the second AP indicated in the second R-TWT information.

In an embodiment, the fourth frame further comprises the first R-TWT information or the second R-TWT information. In an embodiment, the fourth frame comprises a beacon frame or a probe response frame.

In an embodiment, process 1800 may further comprise transmitting, by the first AP, a third frame initiating a TXOP that does not overlap with an R-TWT SP of the second AP indicated in the first R-TWT information.

In another embodiment, process 1800 may further comprise receiving, by the first AP from the second AP, a third frame comprising an R-TWT change count. In an embodiment, based on the R-TWT change count being equal to a stored R-TWT change count, process 1800 may further comprise stopping a backoff procedure to transmit to the second AP a fourth frame requesting R-TWT information of the second AP. In an embodiment, process 1800 may further comprise starting the backoff procedure based on not receiving a beacon frame of the second AP within a first period from a TBTT of the second AP. In another embodiment, process 1800 may further comprise transmitting the fourth frame to the second AP based on the R-TWT change count being different than the stored R-TWT change count.

Figure 19:
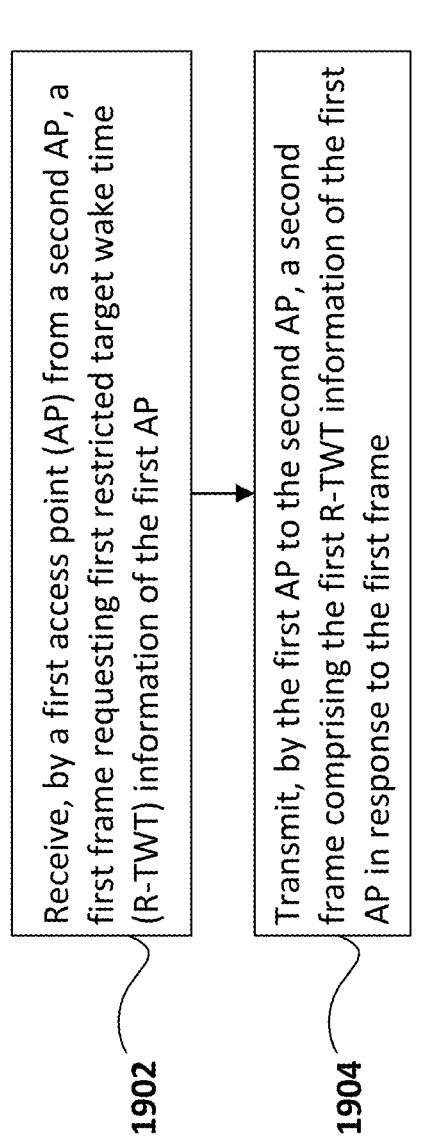
FIG. 19 illustrates another example process according to an embodiment.

FIG. 19 illustrates another example process 1900 according to an embodiment. Example process 1900 may be performed by a first AP, such as AP 1302, 1402, 1502, 1602, or 1702. As shown in FIG. 19, process 1900 includes steps 1902 and 1904.

Step 1902 includes receiving, by the first AP from a second AP, a first frame requesting first R-TWT information of the first AP. The second AP may be an OBSS AP relative to the first AP. The first AP and the second AP may or may not be part of a multi-AP group. In an embodiment, the first AP and the second AP support CMA.

Step 1902 includes transmitting, by the first AP to the second AP, a second frame comprising the first R-TWT information of the first AP in response to the first frame.

In an embodiment, the first R-TWT information comprises information regarding one or more R-TWT SPs.

In an embodiment, process 1900 may further comprise transmitting, by the first AP to the second AP, a third frame comprising second R-TWT information of the first AP and a first R-TWT change count of the first AP. In an embodiment, the third frame comprises a beacon frame or a probe response frame.

In an embodiment, the first frame further comprises the first R-TWT change count.

In an embodiment, the second frame further comprises a second R-TWT change count of the first AP. The second R-TWT change may be equal or different than the first R-TWT change count.

In an embodiment, process 1900 may further comprise transmitting, by the first AP to the second AP, a third frame comprising an R-TWT change count.

In an embodiment, process 1900 may further comprise receiving, by the first AP from the second AP, a third frame requesting second R-TWT information of the first AP, the third frame comprising a first R-TWT change count. In an embodiment, process 1900 may further comprise transmitting, by the first AP to the second AP, a fourth frame comprising the first R-TWT change count based on the first R-TWT change count being equal to a current R-TWT change count. In an embodiment, the fourth frame does not comprise the second R-TWT information of the first AP. In another embodiment, process 1900 may further comprise transmitting, by the first AP to the second AP, a fourth frame comprising a current R-TWT change count based on the first R-TWT change count being different than the current R-TWT change count. In an embodiment, the fourth frame comprises the second R-TWT information of the first AP.

Figure 20:
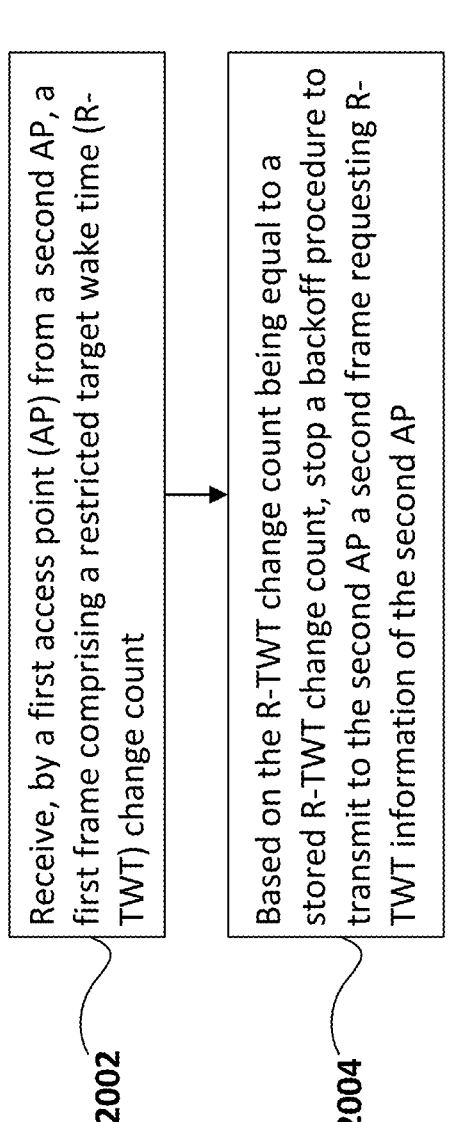
FIG. 20 illustrates another example process according to an embodiment.

FIG. 20 illustrates another example process 2000 according to an embodiment. Example process 2000 may be performed by a first AP, such as AP 1304, 1404, 1504, 1604, or 1704. As shown in FIG. 20, process 2000 includes steps 2002 and 2004.

Step 2002 includes receiving, by the first AP from a second AP, a first frame comprising an R-TWT change count. The second AP may be an OBSS AP relative to the first AP. The first AP and the second AP may or may not be part of a multi-AP group. In an embodiment, the first AP and the second AP support CMA. The R-TWT change count may be an unsigned integer that indicates a state of scheduled R-TWT SP(s) of the second AP.

Step 2004 includes, based on the R-TWT change count being equal to a stored R-TWT change count, stopping, by the first AP, a backoff procedure to transmit to the second AP a second frame requesting R-TWT information of the second AP. The stored R-TWT change count may be stored at the first AP. The stored R-TWT change count may be based on a previously received R-TWT change count.

In an embodiment, process 2000 may further comprise starting, by the first AP, the backoff procedure based on not receiving a beacon frame of the second AP within a first period from a TBTT of the second AP.

In an embodiment, process 2000 may further comprise transmitting the second frame to the second AP based on the R-TWT change count being different than the stored R-TWT change count.

As would be understood by a person of skilled in the art based on the teachings herein, embodiments are not limited by the examples described above. For illustration, further example embodiments in which the inventive concept of the present disclosure is extended to general information sharing among APs are described below.

FIG. 21 illustrates another example process 2100 according to an embodiment. Example process 2100 may be performed by a first AP, such as AP 1304, 1404, 1504, 1604, or 1704. As shown in FIG. 21, process 2100 includes steps 2102 and 2104.

Step 2102 includes transmitting, by the first AP to a second AP, a first frame requesting information of the second AP based on not receiving a beacon frame of the second AP within a first period from a TBTT of the second AP. The information of the second AP may include R-TWT information as described above but is not limited to this example. For example, the information of the second AP may include individual TWT information, broadcast TWT information, and/or an enhanced distributed channel access (EDCA) parameter element.

Step 2104 includes receiving, by the first AP from the second AP, a second frame comprising the requested information of the second AP in response to the first frame.

FIG. 22 illustrates another example process 2200 according to an embodiment. Example process 2200 may be performed by a first AP, such as AP 1304, 1404, 1504, 1604, or 1704. As shown in FIG. 22, process 2200 includes steps 2202 and 2204.

Step 2202 includes transmitting, by the first AP to a second AP, a first frame requesting R-TWT information of the second AP based on not receiving a second frame of the second AP within a first period from a predetermined event associated the second AP. The second frame may comprise a beacon frame of the second AP but is not limited to this example. For example, the second frame may comprise a fast initial link setup (FILS) discovery frame.

The predetermined event associated with the second AP may comprise a TBTT of the second AP but is not limited to this example. For example, the predetermined event may comprise a broadcast TWT SP or a restricted TWT SP.

Step 2204 includes receiving, by the first AP from the second AP, a third frame comprising the R-TWT information of the second AP in response to the first frame.

Figure 23:
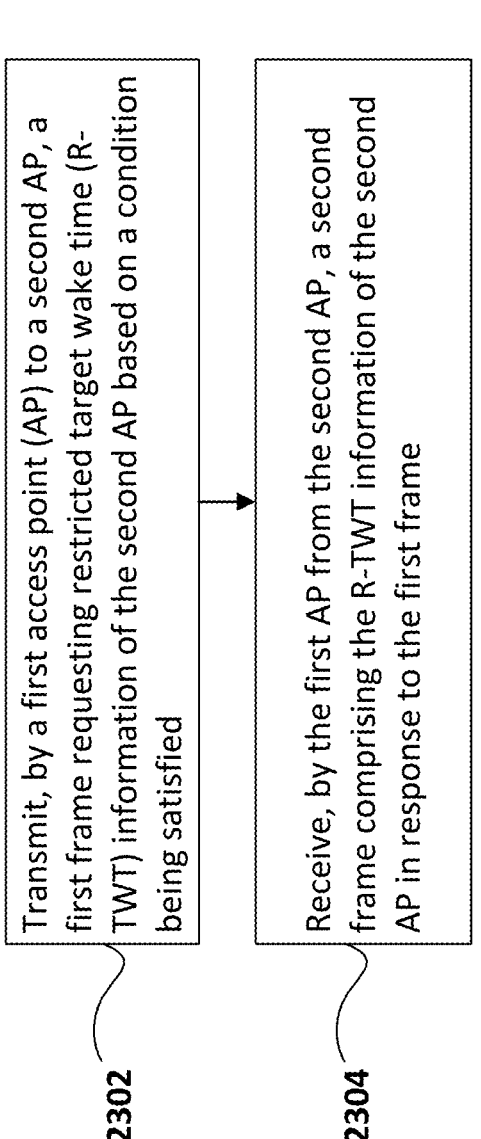
FIG. 23 illustrates another example process according to an embodiment.

FIG. 23 illustrates another example process 2300 according to an embodiment. Example process 2300 may be performed by a first AP, such as AP 1304, 1404, 1504, 1604, or 1704. As shown in FIG. 23, process 2300 includes steps 2302 and 2304.

Step 2302 includes transmitting, by the first AP to a second AP, a first frame requesting R-TWT information of the second AP based on a condition being satisfied.

The condition may comprise not receiving a third frame of the second AP within a first period from a predetermined event associated with the second AP. The predetermined event associated with the second AP may comprise a TBTT of the second AP.

In another embodiment, the condition may comprise the first AP returning to an awake state from a doze state, the first AP scheduling an R-TWT SP, the first AP performing TXOP sharing with the second AP, etc.

Step 2304 includes receiving, by the first AP from the second AP, a second frame comprising the R-TWT information of the second AP in response to the first frame.

What is claimed is:

1. A method comprising:
   receiving, by an access point (AP) from a station, a first individually addressed frame comprising a request to negotiate a restricted target wake time (R-TWT) agreement, wherein the first individually addressed frame indicates a first R-TWT schedule and a request to establish the R-TWT agreement;
   transmitting, by the AP to the station, a second individually addressed frame indicating acceptance of the request to establish the R-TWT agreement; and
   based on the acceptance of the request to establish the R-TWT agreement,
      transmitting, by the AP, a beacon frame indicating the first R-TWT schedule based on having an associated station (STA) with a capability of supporting R-TWT operation;
      receiving, by the AP from the station, a third individually addressed frame indicating an update of the first R-TWT schedule; and
      deferring, by the AP, transmission of a first frame to the associated STA based on a required transmission time of the first frame and a start time of a first R-TWT service period (SP) indicated in the updated first R-TWT schedule.

2. The method of claim 1, wherein the station comprises an AP STA or a non-AP STA.

3. The method of claim 2, wherein the station comprises the AP STA, further comprising:
   transmitting, by the AP to the station, a second frame requesting first R-TWT information of the station based on not receiving a beacon frame of the station within a first period from a target beacon transmission time (TBTT) of the station; and
   receiving, by the AP from the station, a third frame comprising the first R-TWT information of the station in response to the second frame.

4. The method of claim 3, further comprising:
   receiving, by the AP from the station, a fourth frame comprising second R-TWT information of the station and a first R-TWT change count; and
   storing, by the AP, the second R-TWT information and the first R-TWT change count.

5. The method of claim 4, wherein the second frame further comprises the first R-TWT change count.

6. The method of claim 1, further comprising transmitting, by the AP to the associated STA, a second frame comprising a second R-TWT SP of the AP.

7. The method of claim 6, wherein, based on the acceptance of the request to establish the R-TWT agreement, the second R-TWT SP does not overlap with the first R-TWT SP indicated in the updated first R-TWT schedule.

8. The method of claim 1, further comprising transmitting, by the AP, a second frame indicating a transmit opportunity (TXOP), wherein, based on the acceptance of the request to establish the R-TWT agreement, the TXOP does not overlap with the first R-TWT SP indicated in the updated first R-TWT schedule.

9. An access point (AP) comprising:
   one or more processors; and
   memory storing instructions that, when executed by the one or more processors, cause the AP:
      receive from a station a first individually addressed frame comprising a request to negotiate a restricted target wake time (R-TWT) agreement, wherein the first individually addressed frame indicates a first R-TWT schedule and a request to establish the R-TWT agreement;
      transmit to the station a second individually addressed frame indicating acceptance of the request to establish the R-TWT agreement; and
      based on the acceptance of the request to establish the R-TWT agreement,
         transmit a beacon frame indicating the first R-TWT schedule based on having an associated station (STA) with a capability of supporting R-TWT operation;
         receive from the station a third individually addressed frame indicating an update of the first R-TWT schedule; and
         defer transmission of a first frame to the associated STA based on a required transmission time of the first frame and a start time of a first R-TWT service period (SP) indicated in the updated first R-TWT schedule.

10. The AP of claim 9, wherein the station comprises an AP STA or a non-AP STA.

11. The AP of claim 10, wherein the station comprises the AP STA, and wherein the instructions, when executed by the one or more processors, further cause the AP to:
   transmit a second frame requesting first R-TWT information of the station based on not receiving a beacon frame of the station within a first period from a target beacon transmission time (TBTT) of the station; and receive from the station a third frame comprising the first R-TWT information of the station in response to the second frame.

12. The AP of claim 11, wherein the instructions, when executed by the one or more processors, further cause the AP to:

receive from the station a fourth frame comprising second R-TWT information of the station and a first R-TWT change count; and store the second R-TWT information and the first R-TWT change count.

13. The AP of claim 12, wherein the second frame further comprises the first R-TWT change count.

14. The AP of claim 9, wherein the instructions, when executed by the one or more processors, further cause the AP to transmit to the associated STA a second frame comprising a second R-TWT SP of the AP.

15. The AP of claim 14, wherein, based on the acceptance of the request to establish the R-TWT agreement, the second R-TWT SP does not overlap with the first R-TWT SP indicated in the updated first R-TWT schedule.

16. The AP of claim 9, wherein the instructions, when executed by the one or more processors, further cause the AP transmit a second frame indicating a transmit opportunity (TXOP), wherein, based on the acceptance of the request to establish the R-TWT agreement, the TXOP does not overlap with the first R-TWT SP indicated in the updated first R-TWT schedule.

17. A non-transitory computer-readable medium comprising instructions that, when executed by one or more processors of an access point (AP), cause the AP to:

receive from a station a first individually addressed frame comprising a request to negotiate a restricted target wake time (R-TWT) agreement, wherein the first individually addressed frame indicates a first R-TWT schedule and a request to establish the R-TWT agreement;

transmit to the station a second individually addressed frame indicating acceptance of the request to establish the R-TWT agreement; and based on the acceptance of the request to establish the R-TWT agreement, transmit a beacon frame indicating the first R-TWT schedule based on having an associated station (STA) with a capability of supporting R-TWT operation;

receive from the station a third individually addressed frame indicating an update of the first R-TWT schedule; and defer transmission of a first frame to the associated STA based on a required transmission time of the first frame and a start time of a first R-TWT service period (SP) indicated in the updated first R-TWT schedule.

18. The non-transitory computer-readable medium of claim 17, wherein the station comprises an AP STA or a non-AP STA.

19. The non-transitory computer-readable medium of claim 17, wherein the instructions, when executed by the one or more processors, further cause the AP to transmit to the associated STA a second frame comprising a second R-TWT SP of the AP, and wherein, based on the acceptance of the request to establish the R-TWT agreement, the second R-TWT SP does not overlap with the first R-TWT SP indicated in the updated first R-TWT schedule.

20. The non-transitory computer-readable medium of claim 17, wherein the instructions, when executed by the one or more processors, further cause the AP to transmit a second frame indicating a transmit opportunity (TXOP), wherein, based on the acceptance of the request to establish the R-TWT agreement, the TXOP does not overlap with the first R-TWT SP indicated in the updated first R-TWT schedule.

* * * * *